United States Patent

Harms et al.

[11] Patent Number: 5,880,282
[45] Date of Patent: Mar. 9, 1999

[54] TRIPHENDIOXAZINE REACTIVE DYESTUFF

[75] Inventors: Wolfgang Harms, Odenthal; Stefan Ehrenberg, Köln, both of Germany

[73] Assignee: Bayer Aktiengesellschaft, Germany

[21] Appl. No.: 796,407

[22] Filed: Feb. 6, 1997

Related U.S. Application Data

[63] Continuation of Ser. No. 431,525, Apr. 28, 1995, abandoned.

[30] Foreign Application Priority Data

May 5, 1994 [DE] Germany .................. 44 15 780.0

[51] Int. Cl.$^6$ ................ C07D 413/14; C07D 413/12
[52] U.S. Cl. ................ 544/76; 544/75; 544/77
[58] Field of Search .................. 544/75, 76, 77

[56] References Cited

U.S. PATENT DOCUMENTS

| | | | |
|---|---|---|---|
| 4,841,049 | 6/1989 | Seitz ............................... | 544/76 |
| 5,207,801 | 5/1993 | Aeschlimann et al. ............ | 8/549 |
| 5,405,947 | 4/1995 | Hoppe et al. ..................... | 534/618 |

FOREIGN PATENT DOCUMENTS

| | | |
|---|---|---|
| 70807 | 1/1983 | European Pat. Off. . |
| 74928 | 3/1983 | European Pat. Off. . |
| 472975 | 3/1992 | European Pat. Off. . |
| 499588 | 8/1992 | European Pat. Off. . |
| 474596 | 3/1993 | European Pat. Off. . |
| 568876 | 11/1993 | European Pat. Off. . |
| 576123 | 12/1993 | European Pat. Off. . |
| 0629667 | 12/1994 | European Pat. Off. . |
| 0652262 | 5/1995 | European Pat. Off. . |

OTHER PUBLICATIONS

Russ et al, Chem. Abstract 123: 1811 for DE –4,316,539 (1994).
Miyamoto et al, Chem Abstract 114: 64256 for JP–02,209, 969 (1990).
Derwent Abstract of JP 04–255,762 (Sep. 10, 1992).
Derwent Abstract of JP 58–065,759 (Apr. 19, 1983).
Derwent Abstract of JP 81–29 893 (Jul. 11, 1981.

*Primary Examiner*—John M. Ford
*Attorney, Agent, or Firm*—Connolly & Hutz

[57] ABSTRACT

Improved unsymmetric reactive dyestuffs have the following formula

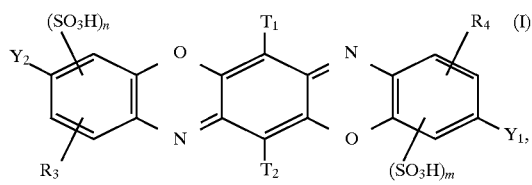

wherein
$Y_1$ is a radical of the formula

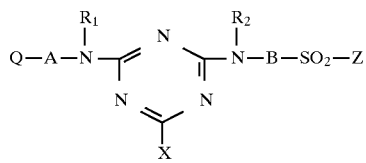

and wherein the other substituents have the meaning given in the description.

9 Claims, No Drawings

TRIPHENDIOXAZINE REACTIVE DYESTUFF

This application is a continuation, of application Ser. No. 08/431,525, filed Apr. 28, 1995, now abandoned.

The present invention relates to novel reactive dyestuffs, mixtures comprising these reactive dyestuffs, process for their preparation and their use.

A large number of reactive dyestuffs for dyeing cellulose materials are known. Among these, triphendioxazine reactive dyestuffs are becoming increasingly important for clear blue shades because of their high tinctorial strength. Such dyestuffs are known, in particular, from EP-A-499 588 (=JP-A-050 981 175), EP-A-74 928 (=JP-A-58/065 759), EP-B-70 807, EP-A-485 336 (=U.S. Pat No. 5,207,801), EP-A-474 596 (=JP-A-4 255 762); EP-A-472 975, EP-A-568 860 (=JP-A-60 49 381), EP-A-576 123 and EP-A-260 227 (=U.S. Pat. No. 4,841049).

In view of the ever higher requirements of reactive dyeings from the economic and ecological aspect, however, dyestuffs of this type of chromophore are still in need of improvement. In particular, the degree of fixing is still unsatisfactory, so that a considerable proportion of the reactive dyestuff is lost from the dyeing process in hydrolyzed form.

Furthermore, the build-up capacity of these dyestuffs is also still in need of improvement.

The dyestuffs described below display significantly improved properties in respect of the requirements mentioned.

The invention relates to reactive dyestuffs of the formula

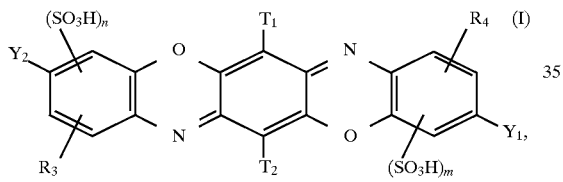

in which
$Y_1$ = a radical of the formula

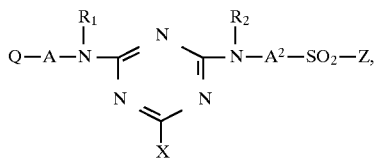

in which
A = a bonding member, in particular $C_2$-$C_6$-alkylene, optionally substituted by OH or $OSO_3H$ or interrupted by heteroatoms, or arylene, optionally substituted by $SO_3H$, COOH, $C_1$-$C_2$-alkyl or Cl-C2-alkoxy,
$A^2$ = an aliphatic bonding member, in particular $C_2$-$C_6$-alkylene, optionally substituted by OH or $OSO_3H$ or interrupted by heteroatoms, $R_1$ = H or $C_1$-$C_4$-alkyl, optionally substituted by OH, $OSO_3H$, COOH, $CONH_2$ or $SO_3H$,
$R_2$ = H $C_1$-$C_4$-alkyl or aryl, optionally substituted by $SO_3H$, COOH, $C_1$-$C_2$-alkyl or $C_1$-$C_2$-alkoxy,

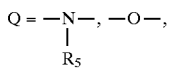

in which $R_5$ = H or $C_1$-$C_4$-alkyl, or is linked with $R_1$ to give a preferably 5- to 6-membered ring,
X = F, Cl, Br or

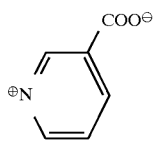

Z = a vinyl group or an ethylene group, which carries a radical which can be split up under alkaline conditions, in particular —CH=$CH_2$, —$CH_2$—$CH_2$—$OSO_3H$, —$CH_2$—$CH_2$—Cl, —$CH_2$—$CH_2$—Br, —$CH_2$—$CH_2$—$S_2O_3H$,
—$CH_2$—$CH_2$—$OPO_3H_2$, —$CH_2$—$CH_2$—$OCOCH_3$,

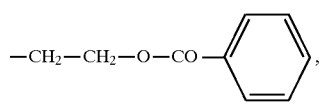

or
—$CH_2$—$CH_2$-OH, excluding the compounds, known from EP-A-499 588 page 38, line 40, from the color base of the formula

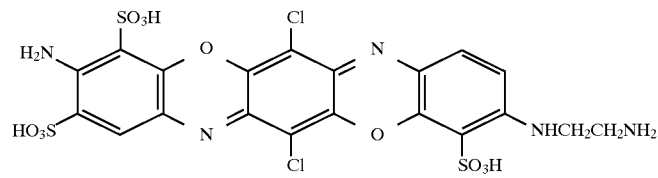

with a β-(β'-chlorethylsulfonyl)-alkylamine,
$Y_2$ = amino, alkylamino, alkoxy or aroxy or
$Y_2$ = $Y_1$,
m = 1 or 2,
n = 1 or 2,
$T_1$ and $T_2$ = independently of one another H, Cl, Br, $C_1$-$C_4$-alkoxy, $C_1$-$C_4$-alkyl or optionally substituted phenoxy or phenyl,
$R_3$ and $R_4$ = independently of one another H, $C_1$-$C_2$-alkyl, $C_1$-$C_2$-alkoxy, carboxyl or halogen (Cl or Br). Heteroatoms are generally accepted as including N, O, S, Se and Te.

A preferred meaning for $Y_2$ is amino; other preferred meanings for $Y_2$ are $C_1$-$C_4$-alkylamino, optionally substituted by OH, $OSO_3H$, $SO_3H$, COOH, $CONH_2$, $NH_2$ or $C_1$-$C_2$-alkoxy or interrupted by heteroatoms, or Ar-$C_1$-$C_2$-alkylamino, in particular phenyl-$C_1$-$C_2$-alkylamino, optionally substituted by $SO_3H$; arylamino, optionally substituted by $SO_3H$, $C_1$–$C_2$-alkoxy or $C_1$–$C_2$-alkyl; $C_1$–$C_4$-alkoxy, optionally substituted by OH, $OSO_3H$ or $C_1$–$C_2$-alkoxy or interrupted by heteroatoms; or aroxy, optionally substituted by $SO_3H$, $C_1$–$C_2$-alkyl or $C_1$–$C_2$-alkoxy.

$C_2$–$C_6$-alkylene bridge members A are, for example: ethylene, 1,3-propylene, 1,2-propylene, 2-hydroxy-1,3-propylene, 2-sulfato-1,3-propylene, 1,4-, 1,3- and 2,3-butylene, 1,5-pentylene, 1,6- and 2,5-hexylene, 1,4- or 1,3-cyclohexylene, —$(CH_2$—$CH_2$—$O)_n$—$CH_2$—$CH_2$—where n 1 to 3,

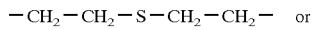

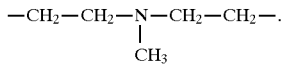

Suitable arylene radicals A are, for example:
1,2-, 1,3- and 1,4-phenylene, 4-sulfo-1,3-phenylene, 6-sulfo-1,3-phenylene, 2- or 3-sulfo-1,4-phenylene, 4,6-disulfo-1,3-phenylene, 2- or 3-methyl-1,4-phenylene, 4- or 6-methyl-1,3-phenylene, 5-methyl-1,2-phenylene, 3-chloro-1,4-phenylene, 4-chloro-1,3-phenylene or 4-chloro-1,2-phenylene and the corresponding methyl- and chlorophenylene radicals substituted by sulfo groups.

Suitable bridge members B are, for example:
ethylene, 1,2- and 1,3-propylene, 1,4-butylene, 1,5-pentylene, 1,6-hexylene, —$CH_2$—$CH_2$—$O$—$CH_2$—$CH_2$—, 2-hydroxy-1,3-propylene, 2-sulfato-1,3-propylene.

Radicals $R_1$ are, in addition to hydrogen, for example:
methyl, ethyl, 1-propyl, 2-hydroxyethyl, 2-sulfatoethyl, 2-sulfoethyl, 2-carboxyethyl, 2-aminocarbonylethyl, 2-methoxy- or 2-ethoxycarbonylethyl or 2-carboxy-1-propyl.

The radicals $R_2$ are, in addition to hydrogen:
methyl, ethyl, 2-hydroxyethyl, 2-sulfatoethyl, in particular phenyl, 2-, 3-, 4-sulfophenyl, 2-, 3-, 4-methylphenyl, 2-, 3-, 4-methoxy- or -ethoxyphenyl and the corresponding methyl-, methoxy- or ethoxyphenyl radicals substituted by sulfo groups, and 2-, 3- and 4-carboxyphenyl.

Radicals $R_5$ can be, in addition to hydrogen, for example: methyl, ethyl, 2-hydroxyethyl and 2-sulfatoethyl.

The radicals $R_1$ and $R_5$ can also be linked directly to one another, and the grouping

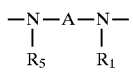

can be a piperidinediyl radical.

Radicals $Y_2$ which may be mentioned are, in addition to $NH_2$.

methylamino, ethylamino, 1- or 2-propylamino, 1- or 2-butylamino, cyclohexylamino, 2-hydroxyethylamino, 2-sulfatoethylamino, 2-sulfoethylamino, 2-carboxyethylamino, 2-aminocarbonylethylamino, 2-amino ethyl amino, 3-amino-1-propylamino, 2-amino-1-propylamino, 2-methyl-1-propyl amino, 2-hydroxy-1-propyl amino, 2-sulfato-1-propylamino, 2-carboxy-1-propyl amino, 2-methoxyethylamino, 2-ethoxyethylamino, 2-(2'-hydroxyethoxy)-ethylamino, 2-(2'-sulfatoethoxy)-ethylamino, anilino, 2-, 3- or 4-sulfoanilino, 2,5-, 2,4-disulfoanilino, 2-, 3- or 4-toluidino, 2-, 3- or 4-anisidino, 2-, 3- or 4-phenetidino and the corresponding toluidine, anisidine and phenetidine radicals substituted by sulfo groups, 4-(2-hydroxyethoxy)-anilino, 4-(2-sulfatoethoxy)-anilino and 3-sulfo-4-(2-sulfatoethoxy)-anilino; $C_1$–$C_4$-alkoxy radicals $Y_2$ are, for example, methoxy, ethoxy, 2-hydroxyethoxy, 2-sulfatoethoxy, 2-hydroxy-1-propoxy, 2-sulfato-1-propoxy, 2,3-dihydroxy-1-propoxy and 2,3-disulfato-1-propoxy.

Aroxy radicals $Y_2$ can be, for example:
phenoxy, 2-, 3- or 4-sulfophenoxy, 2-, 3- or 4-cresoxy, 2-, 3- or 4-methoxyphenoxy, 1- or 2-naphthoxy and the cresoxy, methoxyphenoxy or naphthoxy radicals substituted by sulfo groups.

Particularly preferred compounds of the formula (I) are such compounds in which $Y_2$ does not have the meaning of $Y_1$.

The invention furthermore relates to mixtures of dyestuffs of the formula (I) according to the invention, in particular of the formula (II),

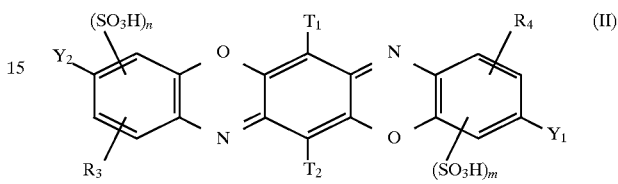

with dyestuffs which are known per se of the following formulae (III) and (IV)

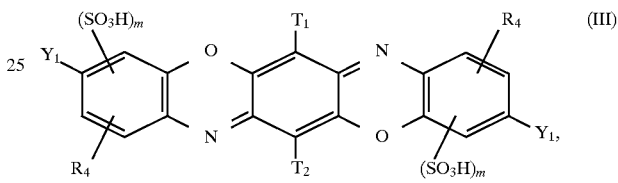

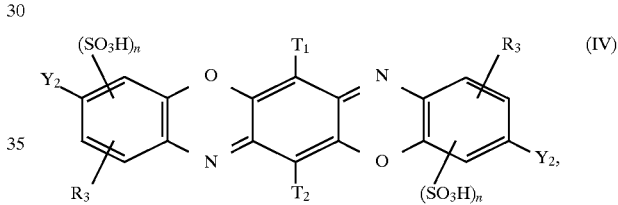

in which
$Y_1$, $Y_2$, $R_3$, $R_4$, $T_1$, $T_2$, m and n have the abovementioned meaning, with the proviso that $Y_2$ does not have the meaning of $Y_1$.

Mixtures of reactive dyestuffs of the formulae (II) and (III) in which $R_3$ and $R_4$ H and $T_1$ and $T_2$=halogen, in particular Cl, are particularly preferred.

Dyestuff mixtures of the formulae

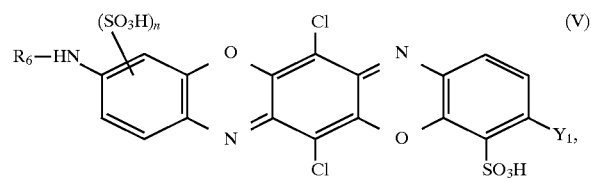

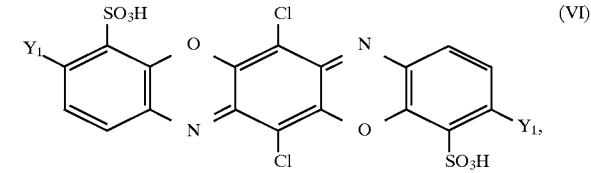

in which
$R_6$=H, methyl, ethyl, 2-hydroxyethyl, 2-sulfatoethyl or 2-sulfato-1-propyl and
$Y_1$ and n have the abovementioned meaning, furthermore are preferred.

Dyestuff mixtures of the formulae

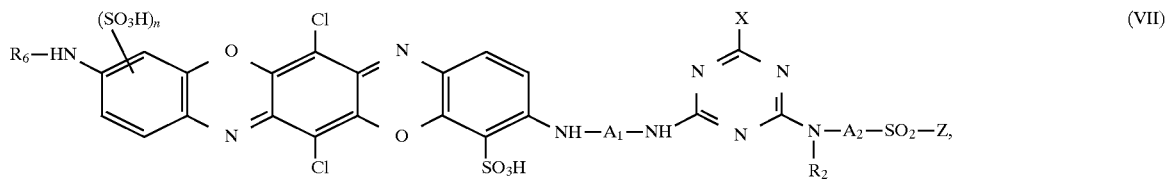

(VII)

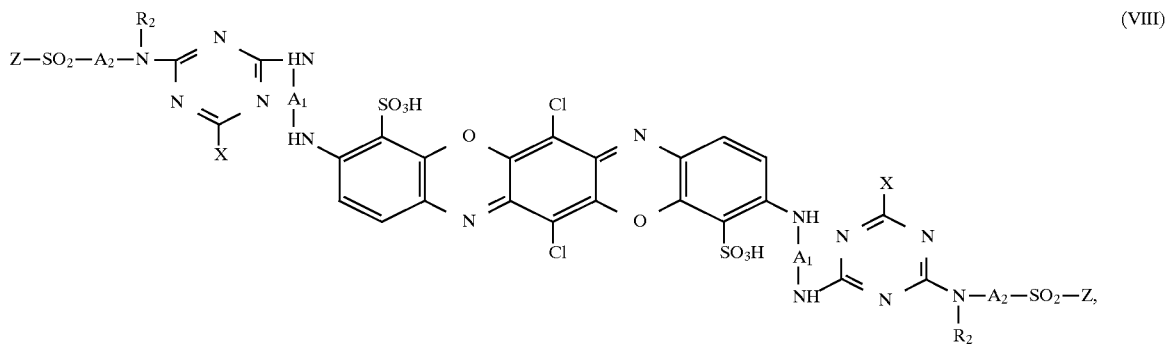

(VIII)

in which $A_1 = -CH_2-CH_2-$, $-CH_2-CH(CH_3)-$, $-(CH_2)_3-$, $-CH_2-CH(OSO_3H)-CH_2-$, cyclohexyl-1,4- and $R_6$, $n$, $X$, $R_2$, $A_2$ and $Z$ have the abovementioned meaning, furthermore are preferred.

Dyestuff mixtures of the formulae

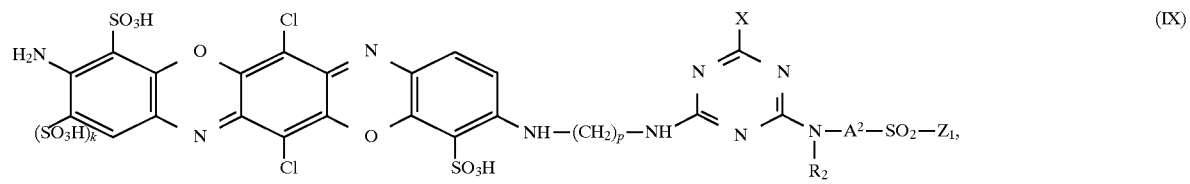

(IX)

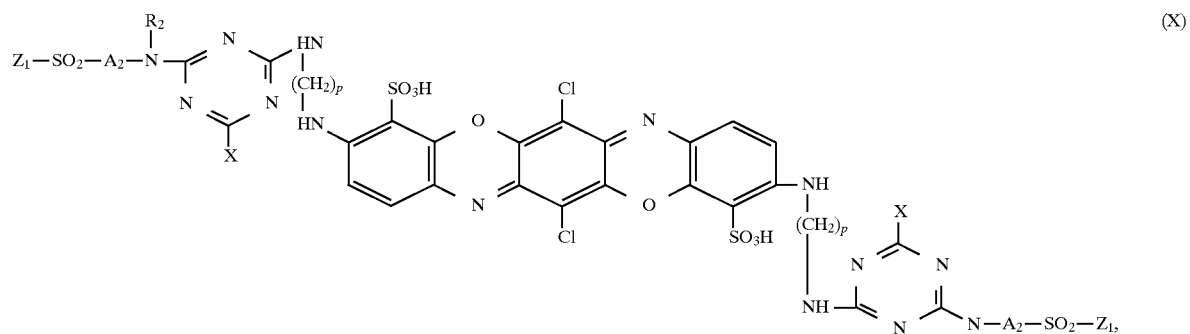

(X)

in which
$Z_1 = -CH=CH_2$, $-CH_2-CH_2-OSO_3H$, $-CH_2-CH_2-Cl$,
$p = 2$ or $3$,
$k = 0$ or $1$ and
$n$, $X$, $R_2$ and $A_2$ have the abovementioned meaning, are particularly preferred.

Dyestuff mixtures of the formulae

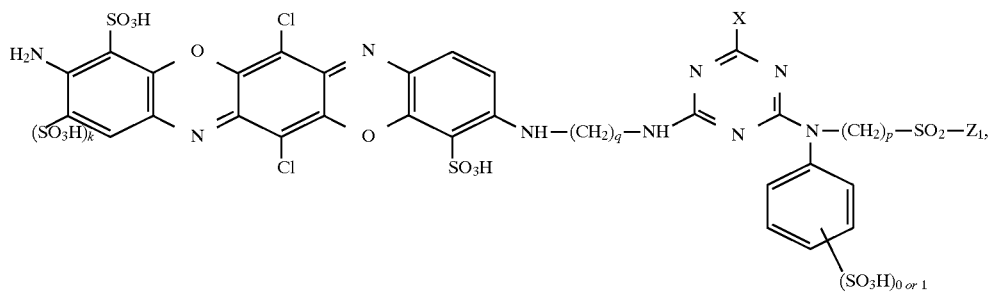
(XI)
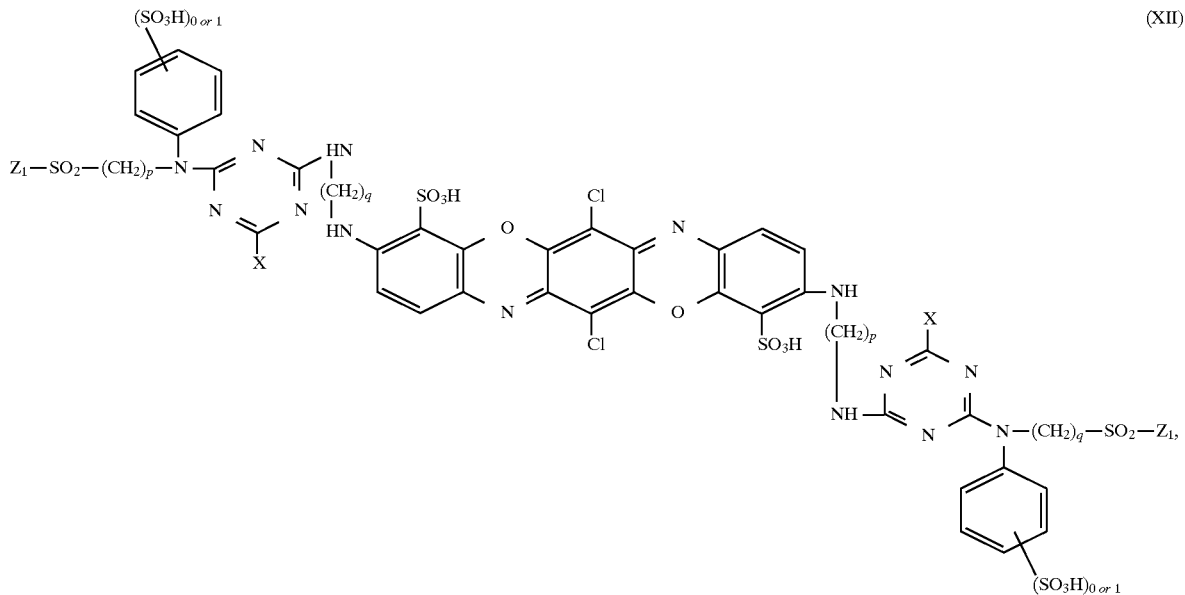
(XII)
in which
q=2 or 3 and
k, p, X and Z, have the abovementioned meaning, are especially preferred.
The dyestuffs (I) are prepared, for example, by reactions of corresponding dyestuffs (XIII)–(XIV)
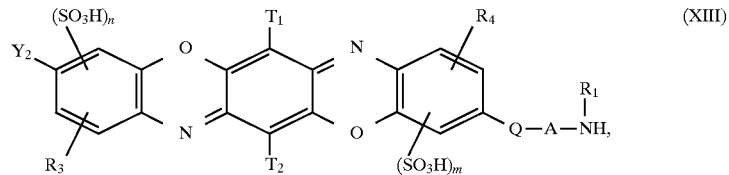
(XIII)
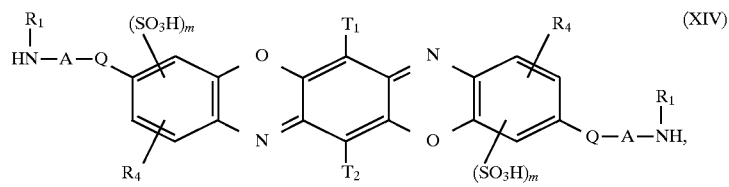
(XIV)
in which
$Y_2$, $R_3$, $R_4$, $T_1$, $T_2$, m, n, Q, A and $R_1$ have the abovementioned meaning, with reactive components of the formula

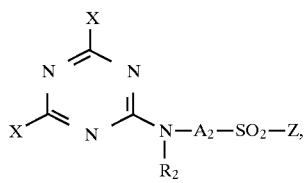

in which

X, $R_2$, $A_2$ and Z have the abovementioned meaning.

Reactive components of the formula (XV) can be prepared by condensation of trihalogenotriazines of the formula

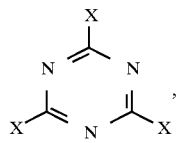
(XVI)

in which

X=F, Cl or Br, with aminosulfone components of the formula

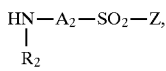
(XVII)

in which $R_2$, $A_2$ and Z have the abovementioned meaning.

Another possibility for the preparation of dyestuffs (I) comprises condensation of chromophores of formula (XIII)–(XIV) with the trihalogenotriazines (XVI) to give dyestuffs of the formula

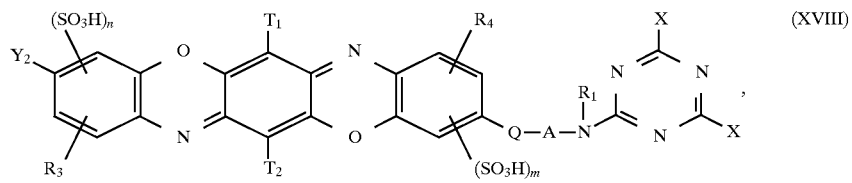
(XVIII)

in which $Y_2$, $R_3$, $R_4$, $T_1$, $T_2$, m, n, Q, A, $R_1$ and X have the abovementioned meaning, and further reaction thereof with molar amounts of an aminosulfone of the formula (XVII).

Aminosulfones of the formula (XVII) are described in EP-A-0 568 860, 0 568 876, 0 385 426, 0 085 025 and DE-A-4 007 049.

Examples of aminosulfones of the formula (XVII) which may be mentioned are:

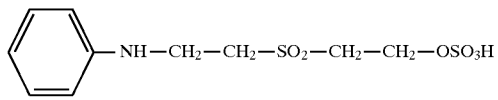

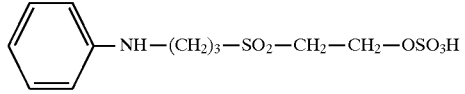

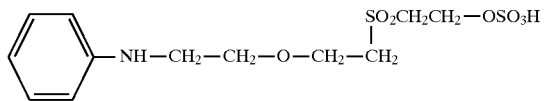

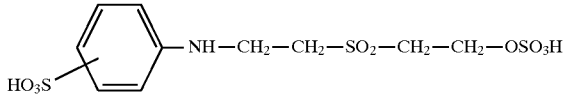

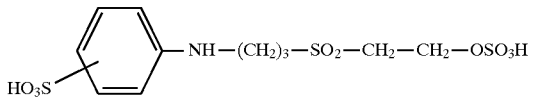

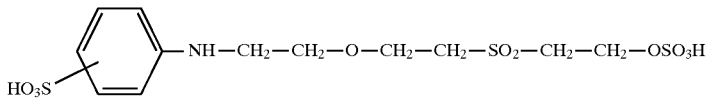

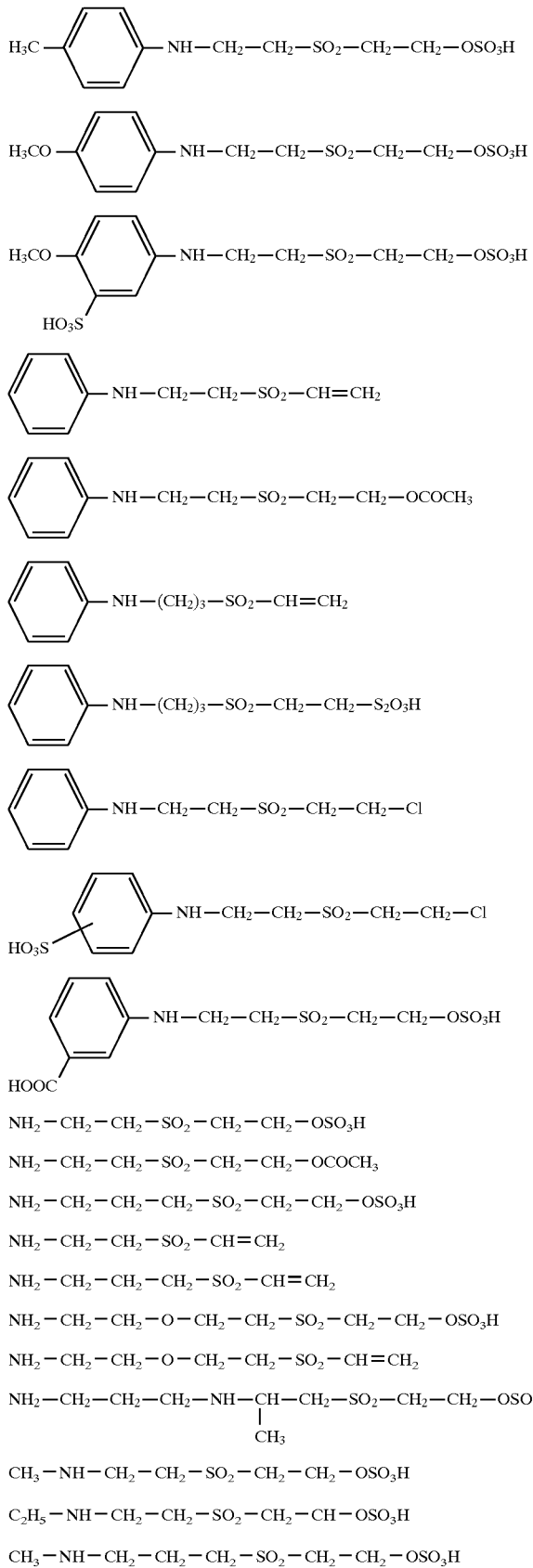
$NH_2-CH_2-CH_2-SO_2-CH_2-CH_2-OSO_3H$
$NH_2-CH_2-CH_2-SO_2-CH_2-CH_2-OCOCH_3$
$NH_2-CH_2-CH_2-CH_2-SO_2-CH_2-CH_2-OSO_3H$
$NH_2-CH_2-CH_2-SO_2-CH=CH_2$
$NH_2-CH_2-CH_2-CH_2-SO_2-CH=CH_2$
$NH_2-CH_2-CH_2-O-CH_2-CH_2-SO_2-CH_2-CH_2-OSO_3H$
$NH_2-CH_2-CH_2-O-CH_2-CH_2-SO_2-CH=CH_2$
$NH_2-CH_2-CH_2-CH_2-NH-\underset{\underset{CH_3}{|}}{CH}-CH_2-SO_2-CH_2-CH_2-OSO_3H$
$CH_3-NH-CH_2-CH_2-SO_2-CH_2-CH_2-OSO_3H$
$C_2H_5-NH-CH_2-CH_2-SO_2-CH_2-CH-OSO_3H$
$CH_3-NH-CH_2-CH_2-CH_2-SO_2-CH_2-CH_2-OSO_3H$ -continued $C_2H_5-NH-CH_2-CH_2-CH_2-SO_2-CH_2-CH_2-OSO_3H$ $HO-CH_2-CH_2-NH-CH_2-CH_2-SO_2-CH=CH_2$ $HO_3SO-O-CH_2-CH_2-NH-CH_2-CH_2-SO_2-CH_2-CH_2-OSO_3H.$ Compounds of the formulae (XIII)–(XIV) are prepared by methods which are known per se by condensation of 1,4-benzoquinones of the formula

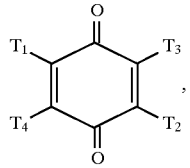
(XVIII)

in which
$T_3$ and $T_4$ = hydrogen, Cl, Br, O-alkyl or O-aryl and
$T_1$ and $T_2$ have the abovementioned meaning,
with preferably approximately molar amounts of amines of the formulae

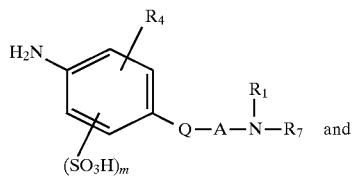
(XIX)

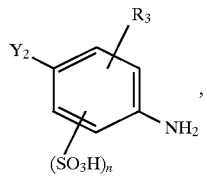
(XX)

in which
$R_7$ = H or alkylcarbonyl
and
A, Q, $R_1$, $R_3$, $R_4$ and $Y_2$ have the abovementioned meaning, to give anil mixtures of the formulae and subsequent cyclization of the anil mixtures (XXI)–(XXIII) to give the corresponding triphendioxazine mixtures. If appropriate, sulfonic acid groups can be introduced in the course of this last operation. Furthermore, if appropriate, if this has not been done beforehand, conversion of the function

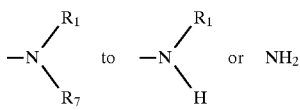

by hydrolysis can additionally be carried out.

Depending on reaction conditions used for the cyclization, the sulfonic acid groups in the benzo rings of the triphendioxazines can occur in either the o- or the p-positions relative to the ring oxygen atoms of the dioxazine system.

According to the solubility ratios of the individual components in the triphendioxazine mixtures or in the anil mixtures (XXI)–(XIII) and depending on the working up conditions, shifts in the ratios of the amounts of the individual components compared with the original ratio present after the synthesis may occur.

Thus, for example, during isolation of the anil mixture, component (XXIII) may become preferentially concentrated in the mother liquor.

The condensation of the benzoquinones of the formula (XVIII) with the amines (XIX) and (XX) is best carried out in an aqueous or aqueous-organic medium with the addition of alkaline condensing agents at pH values of 3 to 11, preferably 4 to 8, and temperatures of 20 to 90° C., preferably 40 to 70° C., or in buffered solutions which contain the above alkali condensing agent. The reaction can also be carried out in a purely organic medium with the addition of acid-binding agents.

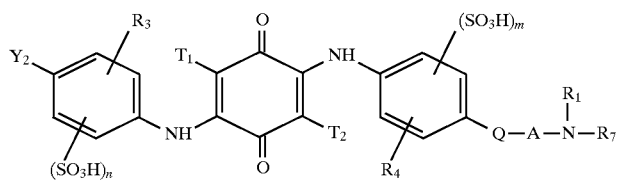
(XXI)

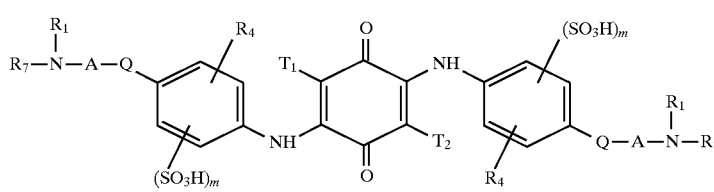
(XXII)

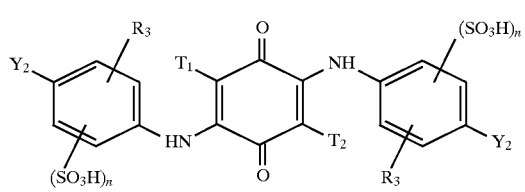
(XXIII)

Alkaline condensing agents are, for example, sodium bicarbonate or potassium bicarbonate, sodium carbonate, sodium acetate or potassium acetate, sodium hydroxide solution, potassium hydroxide solution, sodium phosphates, sodium borate, lithium hydroxide and lithium carbonate.

In general, the condensation products of the formula (XXI)–(XXIII) precipitate out as sparingly soluble brown products.

One variant for the preparation of compounds of the formula (XXI)–(XXIII) comprises addition of amines (XIX) and (XX) to 1,4-benzoquinones of the formula

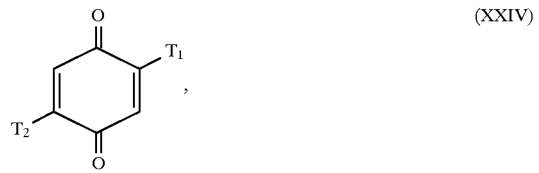

(XXIV)

in which $T_1$ and $T_2$ have the abovementioned meaning, and oxidation of the adducts primarily formed.

The cyclization of the quinone condensation products (XXI)–(XXIII) to give the triphendioxazines can be carried out by methods which are known per se, such as are described in German Offenlegungsschriften 2 122 262, 2 124 080, 2 302 383, 2 344 781, 2 503 611 and 2 823 828 and in British Patent Specification 2 019 872, in particular in concentrated sulfuric acid, and above all in oleum having $SO_3$ contents of 1 to 50%, at temperatures of 10° to 80° C., if appropriate with the addition of oxidizing agents, such as potassium peroxodisulfate or ammonium peroxodisulfate, manganese dioxide or organic peroxides.

Examples of amines of the formula (XIX) which may be mentioned are:

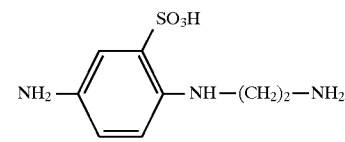
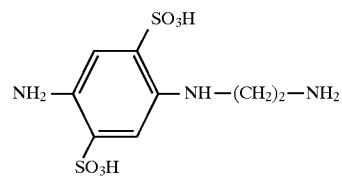
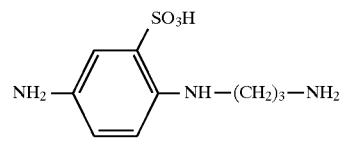
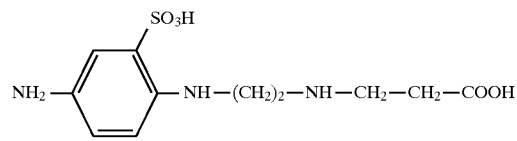
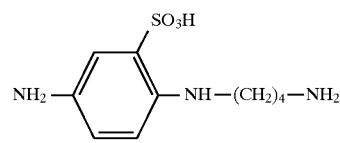
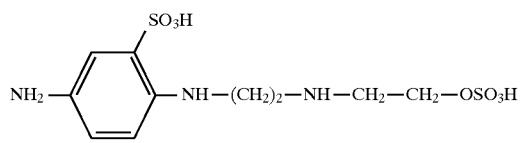
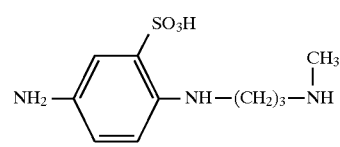
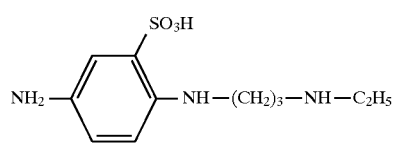
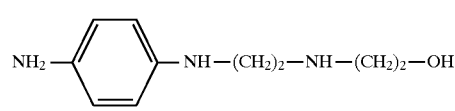
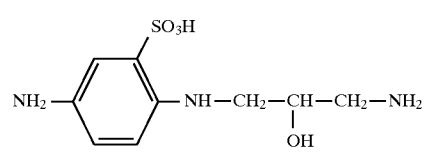
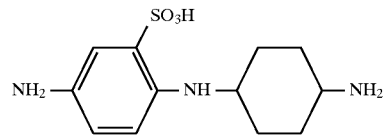
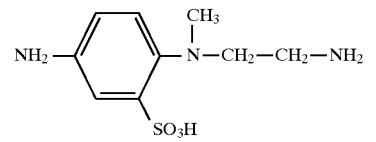
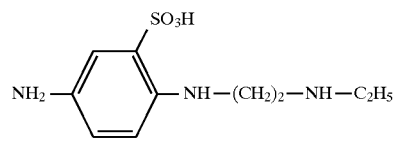
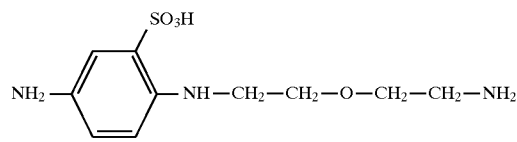

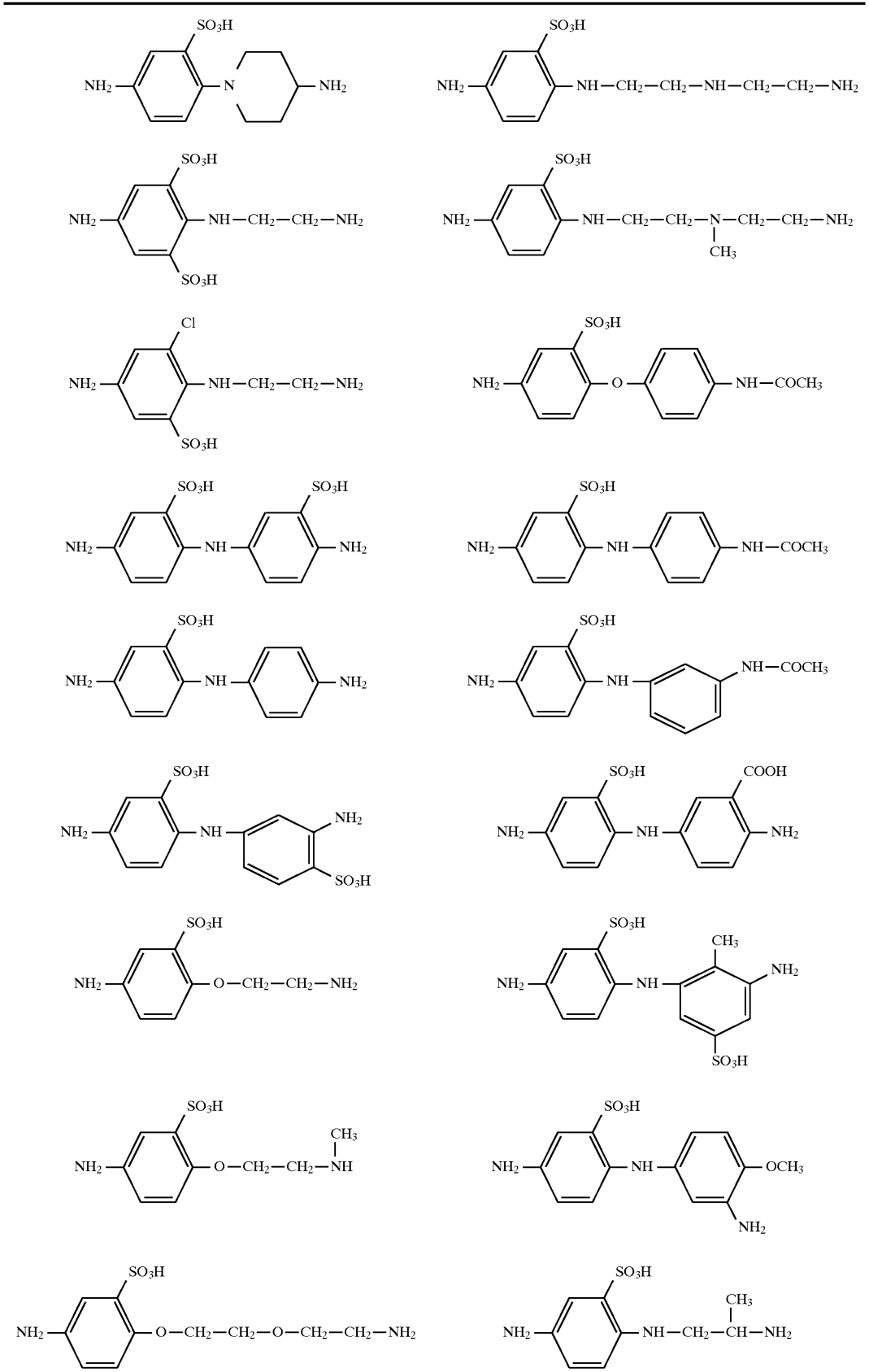

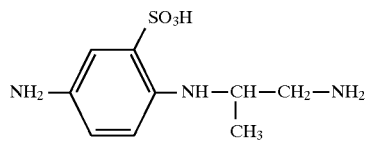 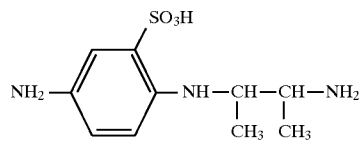
Examples of amines of the formula (XX) which may be mentioned are:
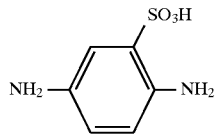 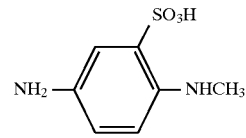
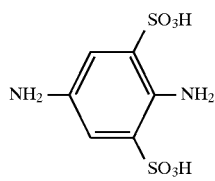 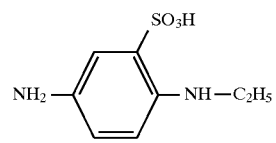
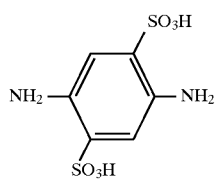 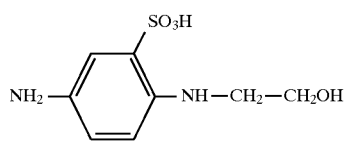
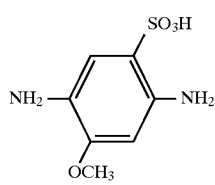 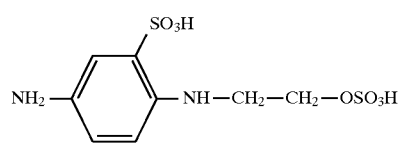
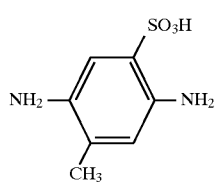 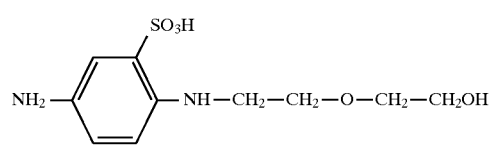
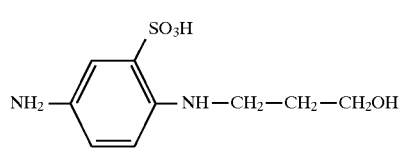 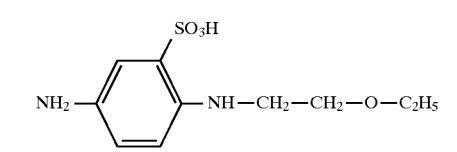
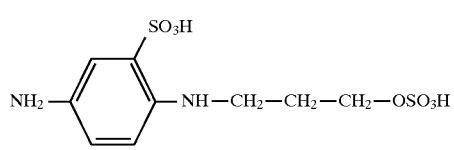 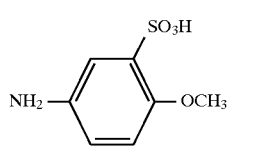
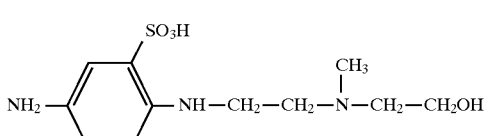 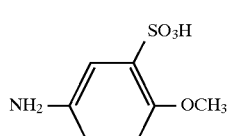

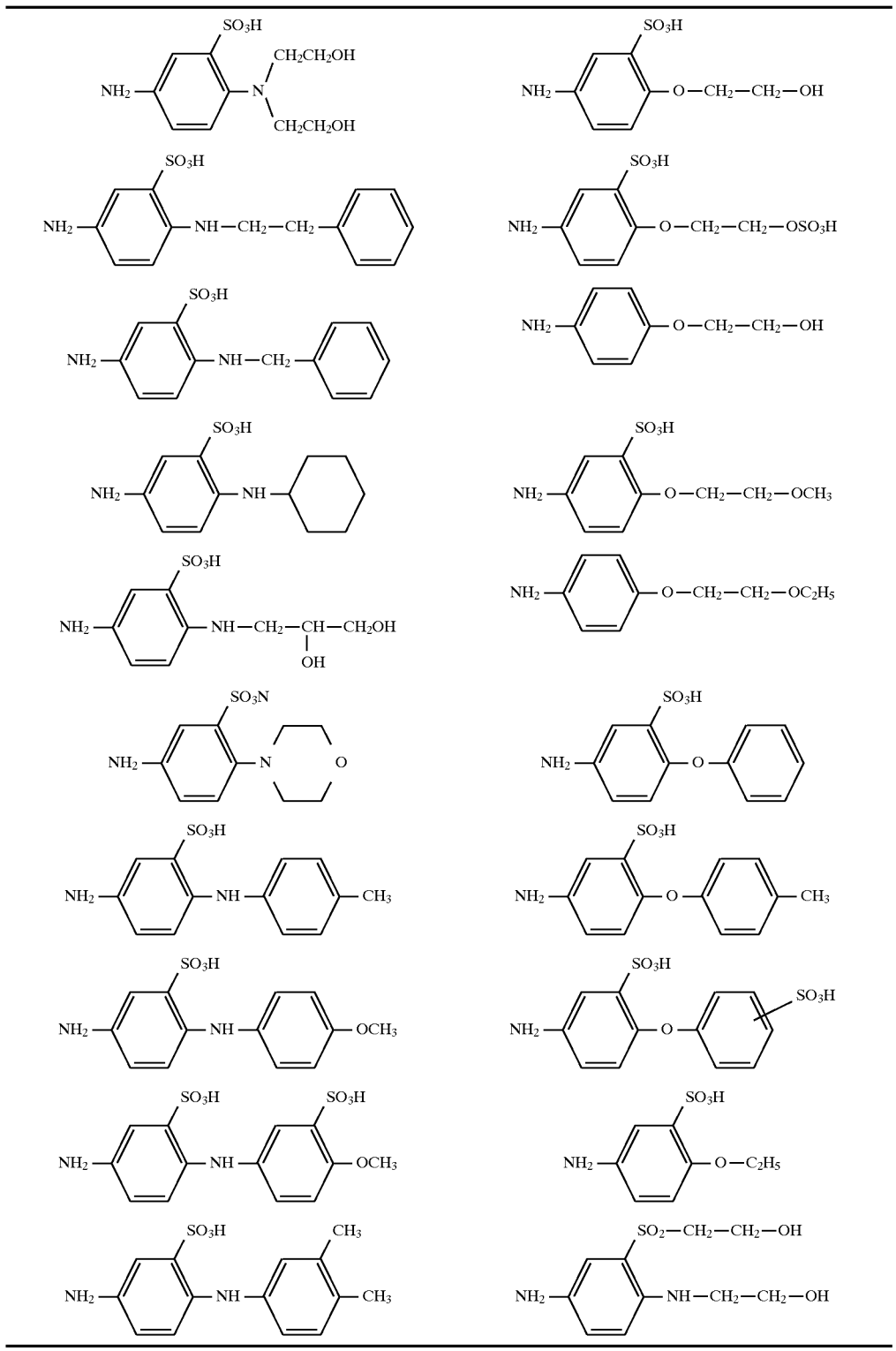

The amines mentioned as examples of the formulae (XIX) and (XX) are merely a selection of a larger number of other possible amines.

The dyestuffs of the formulae (I) and (II) according to the invention are obtained if appropriate with the symmetric compounds of the general formula (III) and if appropriate with compounds of the formula (IV).

The molar percentage ratio of the dyestuff constituents of the formulae (II):(III):(IV) in the context of the formula (I) can vary within the limits (20–80):(80–20):(30–0), preferably in the limits (40–70):(40–25):(20–5).

The dyestuffs of the formula (I) according to the invention give dyeings which have a good depth of color on cellulose materials as well as naturally occurring and synthetic polyamide materials.

As water-soluble dyestuffs, the novel dyestuffs are of preferred interest for dyeing textile materials containing hydroxyl groups and amide groups, in particular materials of natural and regenerated cellulose, as well as synthetic polyamide materials, wool and silk.

The materials mentioned are dyed or printed by the processes which are generally known for water-soluble reactive dyestuffs and are customary in the art. Light- and wet-fast dyeings and prints are then obtained. On cellulose fibres, in particular on cotton, the novel dyestuffs are distinguished by high degrees of fixing and a very good build-up capacity.

The formulae of the water-soluble reactive dyestuffs in the description and in the examples are those of the free acids. The dyestuffs are isolated and used in the form of the lithium, sodium or potassium salts.

The formulae shown in the following examples and tables as a rule in each case relate to one of the reaction products formed in the reaction, unless noted otherwise. This also relates to the compounds which are isomeric with respect to the position of the sulfo groups on the triphendioxazine system.

EXAMPLE 1 a) Preparation of the anil component 59.0 g of chloranil are added to a solution of 50° C., prepared under a nitrogen atmosphere, of 55.4 g of 4-(β-aminoethylamino)-3-sulfo-aniline and 45.1 g of 2,5-diaminobenzolsulfonic acid in 1000 ml of water, which is brought to pH 7, and the pH in the reaction mixture is kept at 5.5–5.8. When the consumption of sodium carbonate has ended, the mixture is cooled to room temperature and the brown precipitate is filtered off with suction, washed with water and acetone and dried. The main constituent in the precipitate which has separated out from the mixture formed of the three substances A–C is the asymmetric compound of the formula A, followed by the symmetric compound B, while the symmetric compound C is greatly concentrated in the mother liquor and wash liquid.

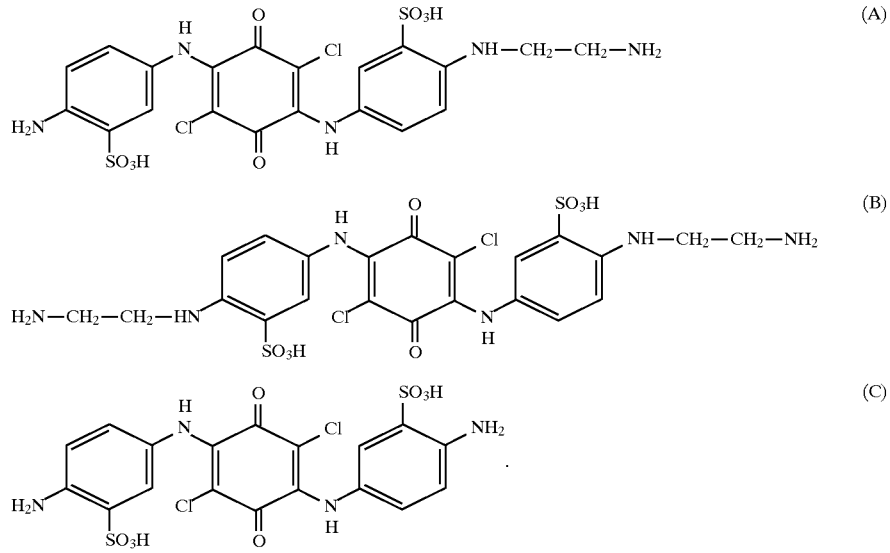

b) Cyclization to the triphendioxazine 85.0 g of the anil intermediate product prepared are introduced into 240 ml of 20% strength oleum at −5° to −10° C. The mixture is then warmed to 25° C. and subsequently stirred until all the anil has dissolved, and 80.3 g of potassium peroxodisulfate are now introduced at 25° C. The mixture is subsequently stirred at room temperature for a further hour and, when the reaction has ended, the solution is poured onto ice and water.

The resulting precipitate is filtered off with suction and washed with 5% hydrochloric acid and water and finally with isopropanol until the runnings are free from sulfate. The product corresponds to the formulae:

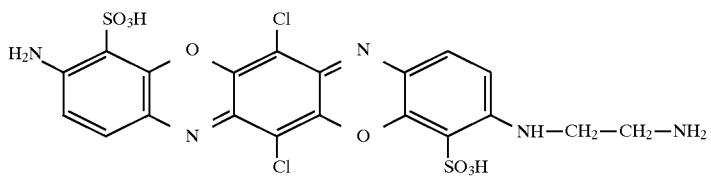 (D)

and in addition

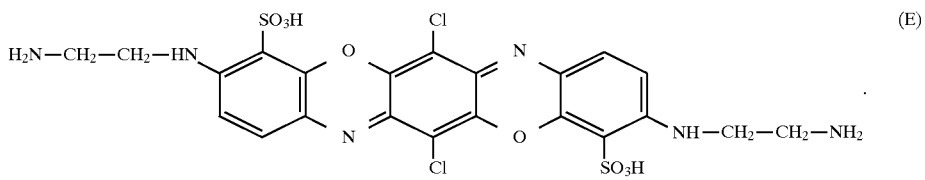 (E)

c) Preparation of the reactive component 46.7 g of a component of the formula

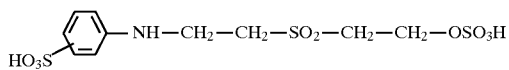

in the form of a solution in 250 ml of water brought to pH 7 (for the preparation, see below) are stirred with 3.7 g of sodium fluoride. 11.6 ml of cyanuric fluoride are allowed to run swiftly into the solution at 0° C. During this operation, the pH falls and is kept at 2.5–2.7 by dropwise addition of 10% strength sodium carbonate solution.

d) Condensation to give the reactive dyestuff 35.0 g of the triphendioxazine mixture obtained in section b) are suspended in 700 ml of water and dissolved by addition of sodium hydroxide solution to pH 12.

About 5% of the solution, prepared in section c), of the reactive component is initially introduced into 100 ml of ice-water. The solutions of the triphendioxazine compound and of the reactive component are now simultaneously added dropwise such that in each case aliquot portions of the two solutions come into contact, and, in the reaction mixture, the pH is kept at 8.5–8.7 by dropwise addition of 2N sodium hydroxide solution and the temperature is kept at 0° to 3° C.

When the reaction has ended, the mixture is warmed to room temperature and the pH is maintained for a further 2 hours.

The dyestuff mixture is salted out of the resulting solution with 23% of potassium chloride, filtered off with suction and covered several times with 25% strength potassium chloride solution. After addition of phosphate buffer solution of pH 6, the dyestuff is dried at 40° C. in vacuo.

It corresponds to a mixture, according to the content of component D in section b), chiefly of the formula

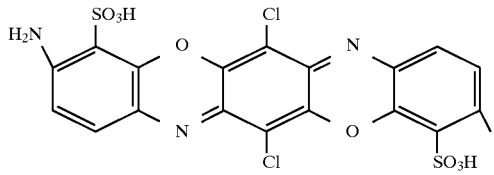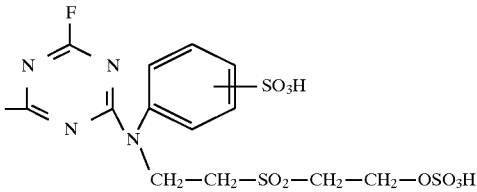

and in addition of the formula

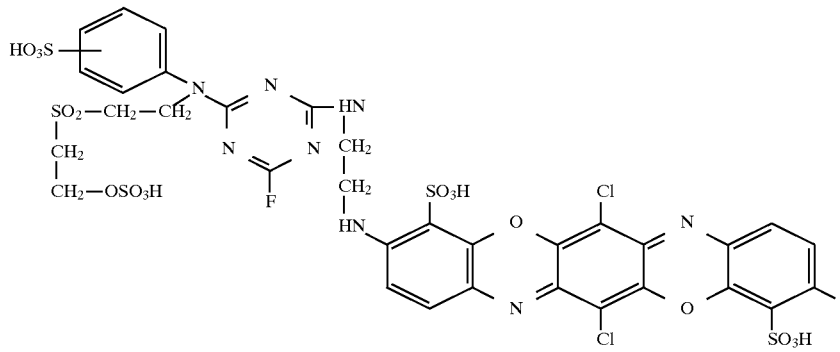

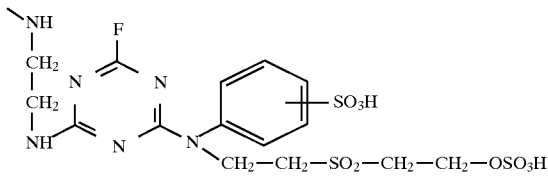

$\lambda_{max}$=615 nm (H$_2$O)

The resulting reactive dyestuff mixture dyes cotton from a long liquor in brilliant blue shades with a high fixing yield and shows an outstanding build-up capacity.

e) Preparation of the reactive aminosulfone component 50.0 g of the compound, described in EP-A-0 568 876, Example 117, of the formula

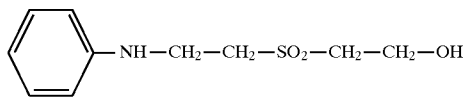

are added dropwise to 100 ml of 20% strength oleum at 25° C. The mixture is subsequently stirred until solution is complete. 40 ml of 65% strength oleum are added and the temperature is kept at 40° C. until a chromatographic sample indicates complete sulfonation of the phenyl radical.

The oleum solution is poured onto a mixture of ice and water and the resulting solution is brought to pH=4.5 by introduction of calcium carbonate and diluted, if necessary, with water. The calcium sulfate is filtered off with suction and washed with water and the resulting filtrates are concentrated. A content assay, for example by titration of an aliquot portion with sodium nitrite in an acid medium, shows a yield of 94% of theory, based on the oil employed.

The resulting solution is further reacted directly (compare section c).

If the resulting product is to be isolated, the solution is evaporated to dryness in vacuo. A dark brown viscous oil which gradually partly crystallizes but which can be converted into a gray powder when ground with isopropanol is obtained. The product is filtered off with suction, washed with isopropanol and dried.

From the evidence of the $^1$H-NMR spectrum, an isomer mixture in a ratio of about 2:1 of the following compounds is present:

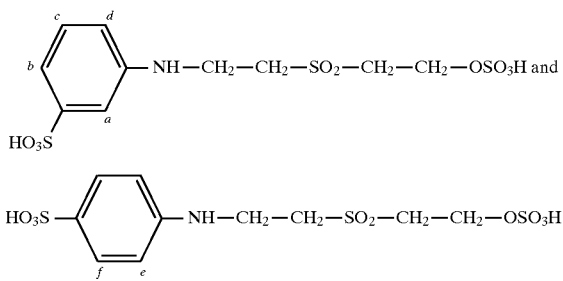

$^1$H-NMR in D$_6$-DMSO

δ=3.37–3.55 ppm (m, 6H)
δ=4.18–4.21 ppm (t, 2H)
δ=6.64–6.70 ppm (d, ⅔×1H) d
δ=6.86 ppm (s, ⅔×1H) a
δ=6.90–6.94 ppm (d, ⅔×1H) b
δ=7.12–7.19 ppm (t, ⅔×1H) c
δ=6.56–6.60 ppm (d, ⅓×2H) e
δ=7.40–7.44 ppm (d, ⅓×2H) f.

The compounds, Example 30 or 47,

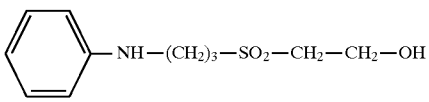

Example 30

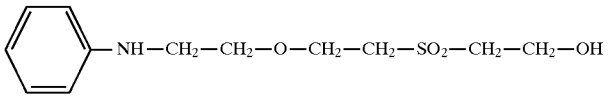

Example 47 can be sulfonated and esterified in an analogous manner to give the compounds

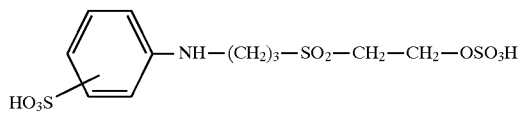

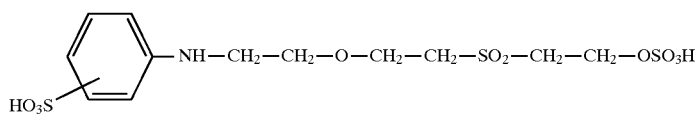

the isomeric sulfonic acids in each case being obtained in a ratio similar to that described above.

EXAMPLE 2 a) Preparation of the anil component 55.4 g of 4-(β-aminoethylamino)-3-sulfoaniline and 64.3 g of 2,5-diaminobenzene-1,3-sulfonic acid are dissolved in 1000 ml of water and 180 ml of isopropanol at pH 6.0 under a nitrogen atmosphere.

59.0 g of chloranil at 50° C. are added and the pH in the reaction mixture is kept at 6.0 with 10% strength potassium bicarbonate solution. When the reaction has ended, the mixture is cooled to 20° C., while stirring, and the pH is then brought to 3.0 with 36% strength hydrochloric acid. The brown precipitate is filtered off with suction and washed with water and then with acetone until the runnings are practically colorless. Drying is carried out at 70° C. in vacuo. The prevailing constituent in the precipitate which has separated out from the mixture formed of the three substances A–C is the component of the formula A,

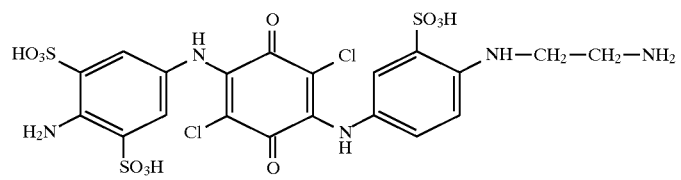

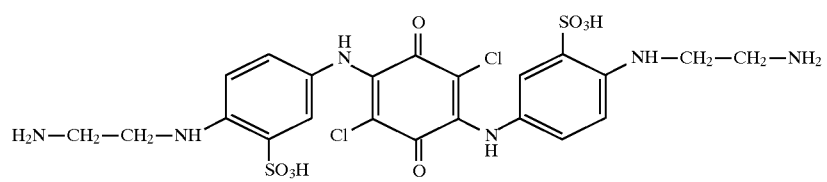

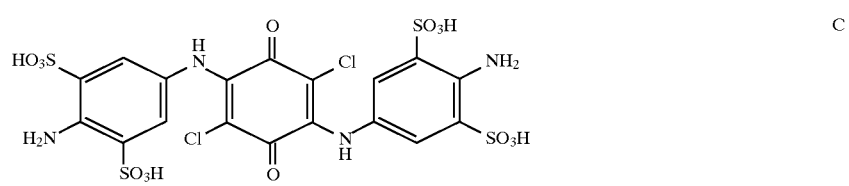

while component C is almost completely in the runnings.

b) Cyclization to the triphendioxazine 78.4 g of anil component from section a) are slowly introduced into 220 ml of 20% strength oleum at −10° C. The temperature is allowed to rise to 25° C. in the course of 1 hour. When complete solution has occurred, 71.3 g of potassium peroxodisulfate are introduced at 25° C. in the course of 1 hour, with external cooling, and the mixture is subsequently stirred for 1 hour and then added to a mixture of 1 kg of ice and 650 ml of water. The precipitate is filtered off with suction, washed free from sulfate with 1.5 l of 5% strength hydrochloric acid and 750 ml of water and dried at 50° C. in vacuo. The product is a mixture and corresponds mainly to the formula

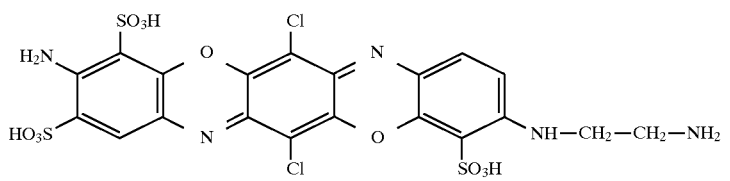

and in addition to the formula

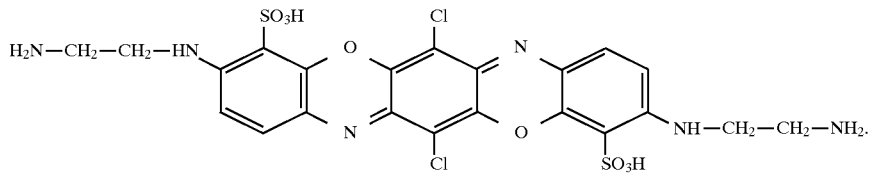

c) Condensation to the reactive dyestuff 39.8 g of the resulting triphendioxazine mixture are suspended in 750 ml of water and dissolved by addition of about 40 ml of 4N sodium hydroxide solution to pH 11.4.

The reactive component of Example 1c) is prepared in the same amount as described there.

100 ml of ice-water and 5% of the reactive component prepared are initially introduced into the reaction vessel. In each case aliquot portions of the solutions of the reactive component and of the triphendioxene component are allowed to run in synchronously in the course of 30–45 minutes and the pH in the reaction mixture is kept at 8.5–8.7 by dropwise addition of 10% strength sodium hydroxide solution and the temperature is kept at 0C.

When the reaction has ended, the pH is now kept within the above limits at room temperature for a further 2 hours.

After addition of 2 g of phosphate buffer mixture (pH 6), the solution of the dyestuff mixture can either be evaporated in vacuo or spray dried, or the product is salted out by addition of 23% of potassium chloride, filtered off with suction, washed with 25% strength potassium chloride solution and, after addition of phosphate buffer, dried at 50° C. in vacuo.

The resulting dyestuff contains, as the main constituent, the product of the formula

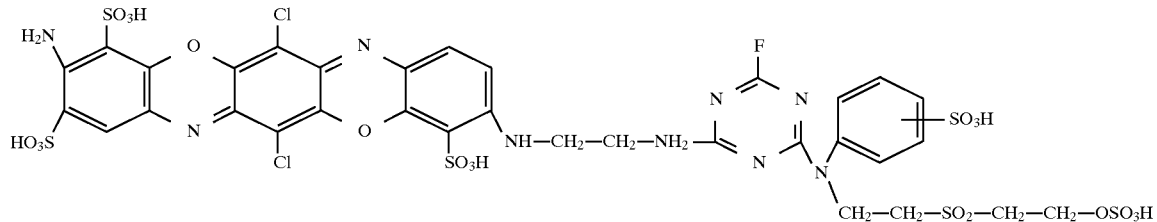

and in addition that of the formula

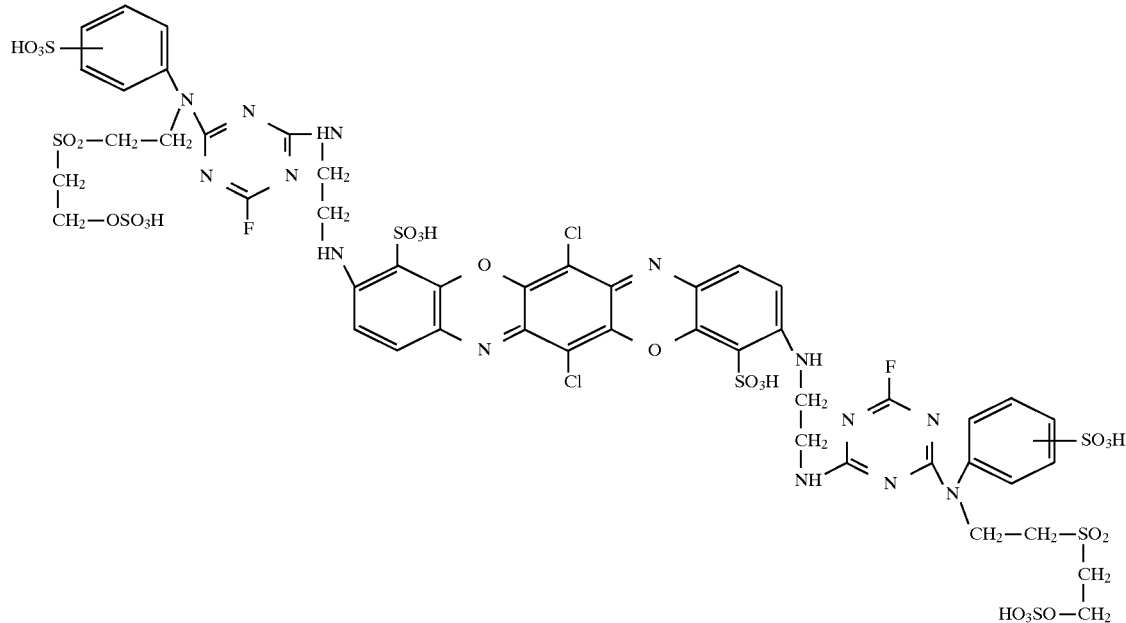

$\lambda_{max}$=611 nm (H$_2$O)

EXAMPLE 3 a) 19.8 g of a compound of the formula

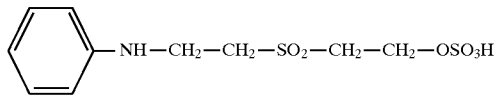

(Preparation according to DE-A-43 04 614, Example 118)

are stirred into 40 ml of water and 40 g of ice. The pH is brought to 6.8 with 10% strength sodium carbonate solution and a suspension which has been prepared from 12.0 g of cyanuric chloride, 110 ml of water and 1.6 ml of an emulsifier at 0° C. is allowed to run in. While the suspension is running in, the pH of the reaction mixture is kept at 4.2–4.5 with 10% strength sodium carbonate solution. A gray suspension of the reactive component

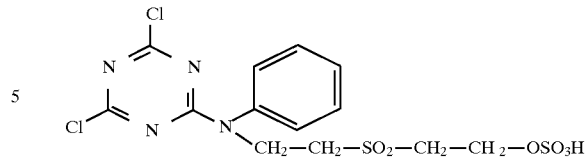

is obtained.

b) 25.2 g of triphendioxazine compound from Example 2b) are suspended in 400 ml of water and dissolved with 50% strength sodium hydroxide solution at pH 11.3 and 20° C. 200 ml of water and 5% of the above suspension of the reactive component are initially introduced into the reaction vessel and the solution of the triphendioxazine color base and the suspension of the reactive component are then allowed to run in synchronous amounts into the initial mixture at 20° C.

During the addition, the pH in the reaction mixture is brought to 8.5–9, and after the addition it is kept further at 8.8 with 2N sodium hydroxide solution until the reaction is complete. The dyestuff is salted out with sodium chloride, filtered off with suction, washed with 20% strength sodium chloride solution and, after making into a paste with phosphate buffer, dried at 40° C. in vacuo. It corresponds in its main content to the formula

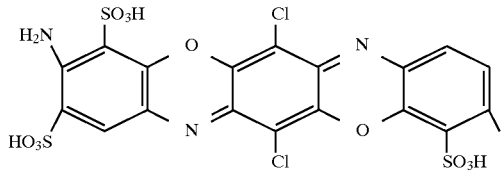

$\lambda_{max}$=612 nm (H$_2$O)

and dyes cotton from a long liquor in neutral blue shades with good fixing yields.

EXAMPLE 4

A similar dyestuff of the formula

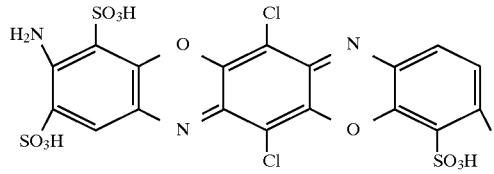
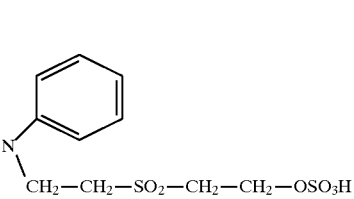

$\lambda_{max}$=611 nm (H$_2$O)

is obtained if 39.8 g of triphendioxazine component of Example 2 is dissolved as described and, instead of the reaction in that example, the subsequent procedure is as follows:

0.11 mol of the compound of the formula

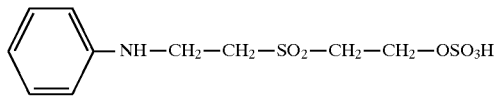

are stirred into 70 ml of water and 70 g of ice and dissolved under neutral conditions. 0.12 mol of cyanuric fluoride is added dropwise at 0 to 3° C. in the course of 5 minutes and the pH is kept at 4.0–4.5 with dilute sodium carbonate solution. The resulting solution of the compound

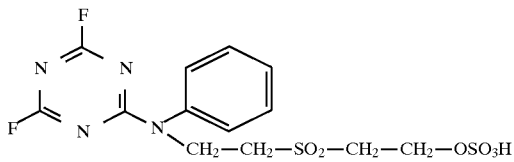

is reacted with the triphendioxazine color base in the manner described in Example 2d).

EXAMPLE 5

35.8 g of triphendioxazine color base mixture of the formula A+B

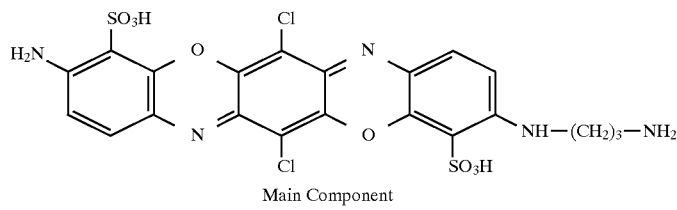
Main Component

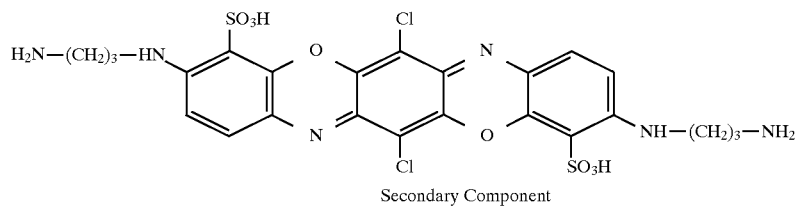
Secondary Component prepared by condensation of 66.2 g of 4-(3-amino-1-propylamino)-3-sulfoaniline and 50.8 g of 2,5-diaminobenzenesulfonic acid with 66.4 g of chloranil and subsequent oxidative cyclization of the anil mixture in the manner described in Examples 1a) and 1b), are subjected to a condensation reaction with the reactive component of Example 1c) of the formula

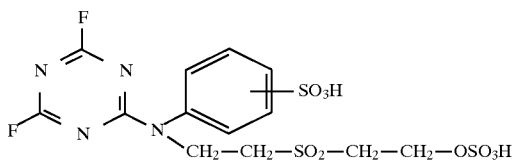

prepared from 46.7 g of amine component and 11.6 ml of cyanuric fluoride in accordance with the doctrine of Example 1 d), to give a dyestuff, the main component of which corresponds to the formula

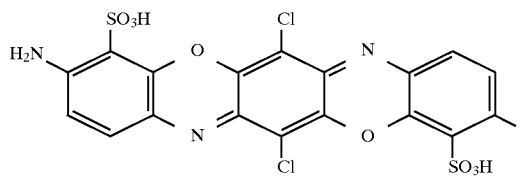

$\lambda_{Max} = 615$ nm (H$_2$O)

accompanied by symmetric reactive dyestuff contents formed from the above formula B.

The dyestuff shows properties similar to those of Example 1d) in respect of fixing yield, build up and fastness properties.

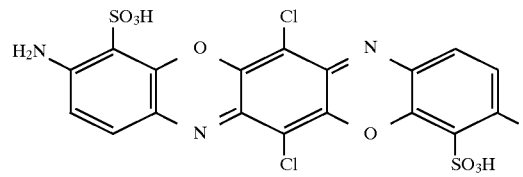

EXAMPLE 6 a) 2.6 g of sodium fluoride are added to a solution of 29.7 g of the compound of the formula

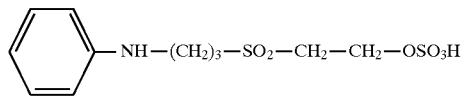

in 380 ml of water, prepared according to DE-A-43 42 615, Examples 30–31. 8.5 ml of cyanuric fluoride are added dropwise. The pH is not allowed to fall below 2.5–2.7, by dropwise addition of 10% strength sodium carbonate solution, and, after the reaction has subsided, it is regulated at 4.0–4.5.

A suspension of the reactive component

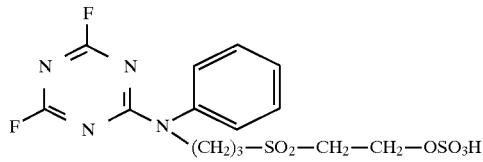

is obtained.

b) 27.0 g of triphendioxazine color base of Example 1b) are dissolved in 540 ml of water at pH 12.

5% of the suspension, prepared in section a) is initially introduced into 150 ml of ice-water, and the solution of the color base and the suspension of the reactive component are allowed to run in synchronously in the course of about 30 minutes. In the reaction mixture, the pH is kept at 8.6–8.8 by simultaneous dropwise addition of 2N sodium hydroxide solution and the temperature is kept at 0° to 3° C. by external cooling.

When the reaction has ended, the temperature is allowed to rise to 20° C. and the mixture is subsequently stirred at pH 8.5–8.6 for a further 2 hours. The dyestuff is salted out of the resulting solution with potassium chloride, filtered off with suction, washed with 25% strength potassium chloride solution and, after making into a paste with phosphate buffer of pH 6, dried at 40° C. in vacuo. It corresponds in its main component to the formula $\lambda_{max} = 616$ nm (H$_2$O)

and has coloristic properties similar to those of the dyestuff of Example 1d).

EXAMPLE 7 a) 30.0 g of a compound of the formula

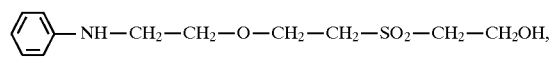

prepared according to DE-A-43 42 615, Example 47, are introduced into a mixture of 19 ml of 96% strength sulfuric acid and 19 ml of 20% strength oleum at 0° to 15° C. When everything has dissolved and the formation of the sulfato ester is complete, the mixture is discharged onto ice and water and the resulting solution is brought to pH 4.0 with calcium carbonate. During this operation, it is also diluted with 150 ml of water. The gypsum which has precipitated out is filtered off with suction and washed with 500 ml of water, and the combined filtrates are concentrated. The gypsum which has subsequently precipitated is filtered off and the content of the solution is determined by titration with sodium nitrite.

1.7 g of sodium fluoride are added to 60 mmol of the resulting solution. 5.7 ml of cyanuric fluoride are added dropwise at 0° C. and the pH is kept at 3.0 with 2N sodium carbonate solution. After the reaction, the pH is brought to 4.0. The compound, obtained in the form of a suspension, corresponds to the formula

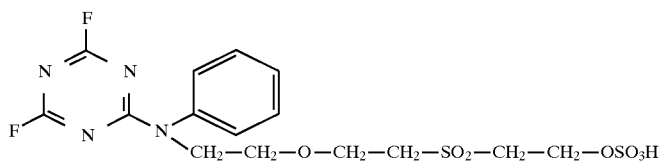

b) 20.0 g of triphendioxazine color base of Example 2b) are dissolved in 380 ml of water with sodium hydroxide solution at pH 11.5.

100 ml of ice-water and 5% of the abovementioned suspension of the reactive component are initially introduced into the reaction vessel. The color base solution and reactive component are introduced synchronously in the course of 30 minutes, the pH in the reaction mixture is kept at 8.5–8.7 with 2n sodium hydroxide solution and the temperature is kept at 0° to 3° C. The reaction is allowed to go to completion under these conditions and the temperature is then kept at 20° C. at the same pH for a further 2 hours. The dyestuff to be isolated from the solution by salting out, filtration with suction, buffering and drying corresponds in its main constituent to the formula

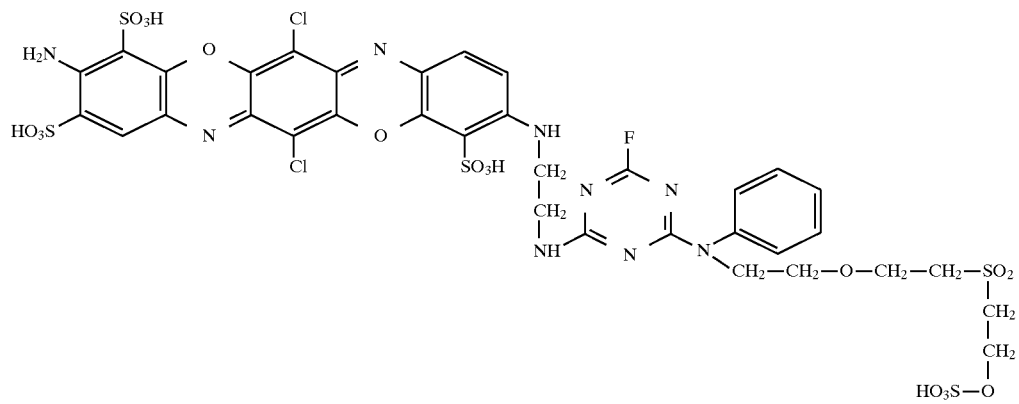

$\lambda_{max}$ = 612 nm (H$_2$O)

and dyes cellulose fibers in brilliant blue shades with good fastness properties.

Other dyestuffs similar to Examples 1 to 7 are obtained when the triphendioxazine color bases, trihalogenotriazines and N-(sulfatoethylsulfonylalkyl)anilines listed in Table 1 are subjected to a condensation reaction by the processes described.

The triphendioxazine color bases are shown here by the formula of their main content.

TABLE 1

| Ex. No. | Triphendioxazine color base | Trihalogenotriazine | N-(sulfatoethylsulfonylalkyl)-aniline | $\lambda_{max}$ ($H_2O$) |
|---|---|---|---|---|
| 8 | triphendioxazine with NH–CH$_2$–CH$_2$–NH$_2$, SO$_3$H, H$_2$N, SO$_3$H substituents | cyanuric chloride (Cl,Cl,Cl-triazine) | NH–CH$_2$–CH$_2$–SO$_2$–CH$_2$–CH$_2$–OSO$_3$H on phenyl | 616 nm |
| 9 | triphendioxazine with NH–(CH$_2$)$_3$–NH$_2$, SO$_3$H, H$_2$N, HO$_3$S, SO$_3$H substituents | Cl,Cl,Cl-triazine | NH–CH$_2$–CH$_2$–SO$_2$–CH$_2$–CH$_2$–OSO$_3$H on phenyl | 611 nm |
| 10 | triphendioxazine with NH–(CH$_2$)$_3$–NH$_2$, SO$_3$H, H$_2$N, HO$_3$S, SO$_3$H substituents | F,F,Cl-triazine | NH–CH$_2$–CH$_2$–SO$_2$–CH$_2$–CH$_2$–OSO$_3$H on phenyl | 612 nm |
| 11 | triphendioxazine with NH–(CH$_2$)$_3$–NH$_2$, SO$_3$H, H$_2$N, HO$_3$S, SO$_3$H substituents | Cl,Cl,Cl-triazine | NH–CH$_2$–CH$_2$–SO$_2$–CH$_2$–CH$_2$–OSO$_3$H on phenyl with SO$_3$H | 611 nm |
| 12 | triphendioxazine with NH–CH$_2$–CH$_2$–NH$_2$, SO$_3$H, H$_2$N, HO$_3$S, SO$_3$H substituents | F,F,F-triazine | NH–CH$_2$–CH$_2$–SO$_2$–CH$_2$–CH$_2$–OSO$_3$H on phenyl | 617 nm |

TABLE 1-continued

| Ex. No. | Triphendioxazine color base | Trihalogenotriazine | N-(sulfatoethylsulfonylalkyl)-aniline | $\lambda_{max}$ ($H_2O$) |
|---|---|---|---|---|
| 13 | | dichlorotriazine | NH—(CH$_2$)$_3$—SO$_2$—CH$_2$—CH$_2$—OSO$_3$H (phenyl) | 611 nm |
| 14 | | difluorotriazine | NH—(CH$_2$)$_2$—O—CH$_2$—CH$_2$—SO$_2$—CH$_2$—CH$_2$—OSO$_3$H (phenyl-SO$_3$H) | 615 nm |
| 15 | | difluorotriazine | NH—(CH$_2$)$_3$—SO$_2$—CH$_2$—CH$_2$—OSO$_3$H (phenyl-SO$_3$H) | 615 nm |
| 16 | | dichlorotriazine | NH—(CH$_2$)$_3$—SO$_2$—CH$_2$—CH$_2$—OSO$_3$H (phenyl-SO$_3$H) | 616 nm |
| 17 | | difluorotriazine | NH—CH$_2$—CH$_2$—SO$_2$—CH$_2$—CH$_2$—OSO$_3$H (phenyl) | |

TABLE 1-continued

| Ex. No. | Triphendioxazine color base | Trihalogenotriazine | N-(sulfatoethylsulfonylalkyl)-aniline | $\lambda_{max}$ (H$_2$O) |
|---|---|---|---|---|
| 18 | | trifluorotriazine | 4-SO$_3$H-anilino-NH-CH$_2$-CH$_2$-SO$_2$-CH$_2$-CH$_2$-OSO$_3$H | 617 nm |
| 19 | | trifluorotriazine | 4-SO$_3$H-anilino-NH-CH$_2$-CH$_2$-SO$_2$-CH$_2$-CH$_2$-OSO$_3$H | 610 nm |
| 20 | | trifluorotriazine | anilino-NH-CH$_2$-CH$_2$-SO$_2$-CH$_2$-CH$_2$-OSO$_3$H | 616 nm |
| 21 | | dichlorofluorotriazine | 4-SO$_3$H-anilino-NH-CH$_2$-CH$_2$-SO$_2$-CH$_2$-CH$_2$-OSO$_3$H | 616 nm |
| 22 | | trifluorotriazine | 4-SO$_3$H-anilino-NH-CH$_2$-CH$_2$-SO$_2$-CH$_2$-CH$_2$-OSO$_3$H | |

TABLE 1-continued

| Ex. No. | Triphendioxazine color base | Trihalogenotriazine | N-(sulfatoethylsulfonylalkyl)-aniline | $\lambda_{max}$ (H$_2$O) |
|---|---|---|---|---|
| 23 | 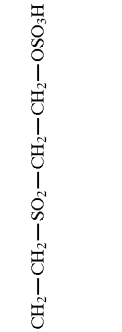 | 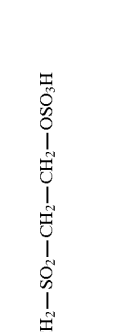 | 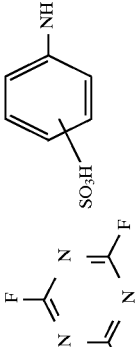 | 623 nm |
| 24 | 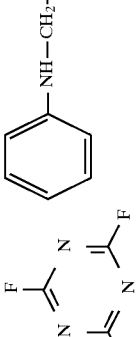 | trifluorotriazine | NH—CH$_2$—CH$_2$—SO$_2$—CH$_2$—CH$_2$—OSO$_3$H (phenyl) | 625 nm |
| 25 |  | dichloro-fluoro triazine | NH—CH$_2$—CH$_2$—SO$_2$—CH$_2$—CH$_2$—OSO$_3$H (phenyl-SO$_3$H) | 595 nm |
| 26 | 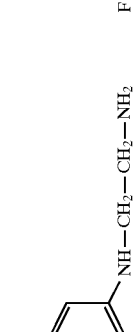 | trichlorotriazine | NH—CH$_2$—CH$_2$—SO$_2$—CH$_2$—CH$_2$—OSO$_3$H (phenyl) | |
| 27 | 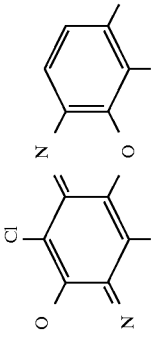 | trifluorotriazine | NH—CH$_2$—CH$_2$—SO$_2$—CH$_2$—CH$_2$—OSO$_3$H (phenyl) | |

TABLE 1-continued

| Ex. No. | Triphendioxazine color base | Trihalogenotriazine | N-(sulfatoethylsulfonylalkyl)-aniline | $\lambda_{max}$ (H$_2$O) |
|---|---|---|---|---|
| 28 | | F-triazine-F,F | NH—CH$_2$—CH$_2$—SO$_2$—CH$_2$—CH$_2$—OSO$_3$H | 616 nm |
| 29 | | Br-triazine-Br,Br | NH—CH$_2$—CH$_2$—SO$_2$—CH$_2$—CH$_2$—OSO$_3$H | 616 nm |
| 30 | | Cl-triazine-Cl,Cl | NH—CH$_2$—CH$_2$—SO$_2$—CH=CH$_2$ | 610 nm |
| 31 | | Cl-triazine-Cl,Cl | NH—CH$_2$—CH$_2$—SO$_2$—CH—CH$_2$—Cl | |
| 32 | | F-triazine-F,F | NH(C$_6$H$_4$-SO$_3$H)—CH$_2$—CH$_2$—SO$_2$—CH=CH$_2$ | 617 nm |

TABLE 1-continued

| Ex. No. | Triphendioxazine color base | Trihalogenotriazine | N-(sulfatoethylsulfonylalkyl)-aniline | $\lambda_{max}$ ($H_2O$) |
|---|---|---|---|---|
| 33 | | trifluorotriazine | $NH-(CH_2)_3-SO_2-CH_2-CH_2-OSO_3H$ on phenyl | 623 nm |
| 34 | | trifluorotriazine | $NH-CH_2-CH_2-SO_2-CH_2-CH_2-OSO_3H$ on phenyl with $SO_3H$ | |
| 35 | | trifluorotriazine | $NH-CH_2-CH_2-SO_2-CH_2-CH_2-OSO_3H$ on phenyl with $SO_3H$ | |
| 36 | | trifluorotriazine | $NH-CH_2-CH_2-SO_2-CH_2-CH_2-OSO_3H$ on phenyl with $SO_3H$ | |
| 37 | | trifluorotriazine | $NH-CH_2-CH_2-SO_2-CH_2-CH_2-OSO_3H$ on phenyl | |

TABLE 1-continued

| Ex. No. | Triphendioxazine color base | Trihalogenotriazine | N-(sulfatoethylsulfonylalkyl)-aniline | $\lambda_{max}$ (H$_2$O) |
|---|---|---|---|---|
| 38 | | | | 611 nm |
| 39 | | | | 617 nm |
| 40 | | | | 612 nm |
| 41 | | | | 616 nm |
| 42 | | | | 598 nm |

TABLE 1-continued

| Ex. No. | Triphendioxazine color base | Trihalogenotriazine | N-(sulfatoethylsulfonylalkyl)-aniline | $\lambda_{max}$ (H$_2$O) |
|---|---|---|---|---|
| 43 | (triphendioxazine structure with CH$_3$—SO$_3$H, SO$_3$H, Cl, Cl, and NH—CH$_2$—CH$_2$—NH$_2$ substituents) | trifluorotriazine | phenyl—NH—CH$_2$—CH$_2$—SO$_3$—CH$_2$—CH$_2$—OSO$_3$H | |
| 44 | (triphendioxazine structure with CH$_2$—SO$_3$H, SO$_3$H, Cl, Cl, and NH—CH$_2$—CH$_2$—NH$_2$ substituents) | trifluorotriazine | SO$_3$H-phenyl—NH—CH$_2$—CH$_2$—SO$_2$—CH=CH$_2$ | |
| 44a | (triphendioxazine structure with SO$_3$H, NH$_2$, SO$_3$H, Cl, Cl, and NH—CH$_2$—CH(CH$_3$)—NH$_2$ substituents) | trifluorotriazine | SO$_3$H-phenyl—NH—CH$_2$—CH$_2$—SO$_2$—CH$_2$—CH$_2$OSO$_3$H | |
| 44b | (triphendioxazine structure with SO$_3$H, NH$_2$, SO$_3$H, Cl, Cl, and NH—CH$_2$—CH(CH$_3$)—NH$_2$ substituents) | trifluorotriazine | phenyl—NH—CH$_2$—CH$_2$—SO$_2$—CH$_2$—CH$_2$OSO$_3$H | |

EXAMPLE 45 a) 16.8 g of 3-(2'-sulfatoethylsulfonyl)-propylamine prepared as described in EP-A-0 385 426, are suspended in ice-water (pH of 8.0).

14.0 g of cyanuric chloride are stirred in ice/water with an emulsifier. The above amine component is metered into the cyanuric chloride suspension and the pH is kept at 7.0 at 0° to 3° C. After 2 hours, the temperature is allowed to rise to 10° C. with further pH control.

When the consumption of sodium carbonate has stopped, the resulting solution of the compound

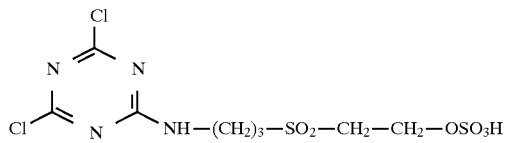

is clarified with 2.0 g of a clarifying agent.

b) 26.7 g of triphendioxazine compound from Example 2b) are dissolved in 500 ml of water at pH 11.5.

5% of the above solution of the reactive component is initially introduced into 150 ml of water. The solution of the color base and of the reactive component are now simultaneously added dropwise, and the pH in the reaction mixture is kept at 9.0 and the temperature at 20° to 23° C.

After the dropwise addition, stirring is continued at pH 9.0 for a further hour and the reaction is then brought to completion at pH 8.5 to 8.7. Thereafter, the dyestuff is salted out, filtered off with suction and washed.

It corresponds in its main content to the formula

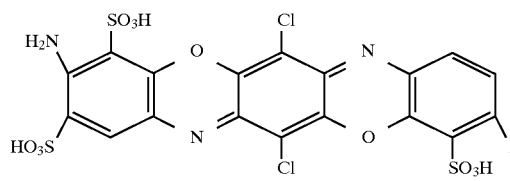 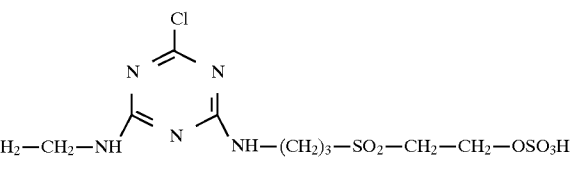

$\lambda_{max}=611$ nm (H$_2$O)

and dyes cotton in clear blue shades with good fixing yields and fastness properties.

EXAMPLE 46

If instead of the 16.8 g of 3-(2'-sulfatoethylsulfonyl)-propylamine in Example 45a) 15.8 g of 2-(2'-sulfatoethylsulfonyl)-ethylamine, which can be obtained as described in U.S. Pat. No. 2,785,190 from 2-chloroethylamine and 2-mercaptoethanol and subsequent H$_2$O$_2$ oxidation and esterification with sulfuric acid, are employed and the subsequent procedure is otherwise according to Example 45b), a dyestuff which corresponds in its main content to the formula

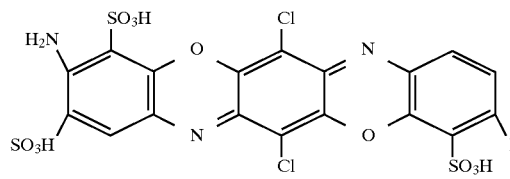

and is similar to the dyestuff of Example 45 in its properties is obtained.

Other dyestuffs similar to Examples 45–46 are obtained when the triphendioxazine color bases, trihalogenotriazines and 2-sulfatoethylsulfonyl-alkylamines listed in Table 2 are subjected to a condensation reaction with one another, the triphendioxazine color bases being shown by the formula of their main content.

TABLE 2

| Ex. No. | Triphendioxazine color base | Trihalogenotriazine | N-(sulfatoethylsulfonylalkyl)-aniline | $\lambda_{max}$ ($H_2O$) |
|---|---|---|---|---|
| 47 | (structure with $H_2N$, $SO_3H$, Cl, NH–(CH$_2$)$_3$–NH$_2$, SO$_3$H) | trichlorotriazine | $NH_2-(CH_2)_3-SO_2-CH_2-CH_2-OSO_3H$ | 616 nm |
| 48 | (structure with $H_2N$, $SO_3H$, Cl, NH–(CH$_2$)$_3$–NH$_2$, SO$_3$H) | trichlorotriazine | $NH_2-CH_2-CH_2-O-CH_2-CH_2-SO_2-CH_2-CH_2-OSO_3H$ | |
| 49 | (structure with $H_2N$, $SO_3H$, Cl, NH–(CH$_2$)$_3$–NH$_2$, SO$_3$H) | trifluorotriazine | $NH_2-CH_2-CH_2-CH_2-SO_2-CH_2-CH_2-OSO_3H$ | |
| 50 | (structure with $H_2N$, $SO_3H$, Cl, NH–CH$_2$–CH$_2$–NH$_2$, SO$_3$H) | trifluorotriazine | $NH_2-(CH_2)_3-SO_2-CH_2-CH_2-OSO_3H$ | |

TABLE 2-continued
| Ex. No. | Triphendioxazine color base | Trihalogenotriazine | N-(sulfatoethylsulfonylalkyl)-aniline | $\lambda_{max}$ (H$_2$O) |
|---|---|---|---|---|
| 51 | 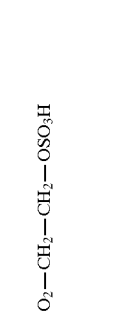 | 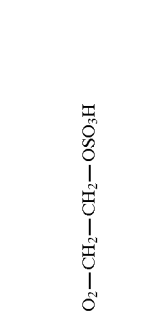 | CH$_3$<br>|<br>HN—CH$_2$—CH$_2$—SO$_2$—CH$_2$—CH$_2$—OSO$_3$H | |
| 52 | 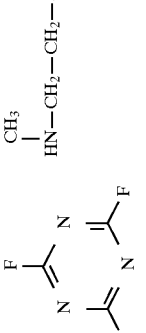 | 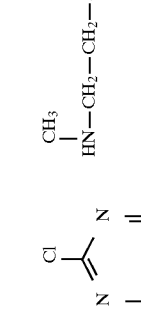 | CH$_3$<br>|<br>HN—CH$_2$—CH$_2$—SO$_2$—CH$_2$—CH$_2$—OSO$_3$H | 611 nm |
| 53 | 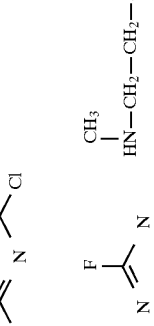 | 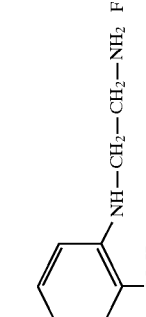 | CH$_3$<br>|<br>HN—CH$_2$—CH$_2$—SO$_2$—CH$_2$—CH$_2$—OSO$_3$H | |

EXAMPLE 54 a) Preparation of the anil 51.8 g of 4,4'-diaminodiphenylamine-2,3'-disulfonic acid and 37.6 g of 2,5-diamninobenzenesulfonic acid are dissolved in 800 ml of water at pH 7 under nitrogen. 0.2 ml of an emulsifier based on sulfonated castor oil is added and the mixture is heated to 50° C. 49.2 g of chloranil are introduced in the course of 15 minutes. The pH in the reaction mixture is kept at 5.8–6 with 10% strength sodium carbonate solution. When the reaction has ended, the pH is brought to 6.5 and the solution is clarified hot to remove a little tetrachlorohydroquinone which has formed.

The pH in the filtrate is brought to 2.5 and the precipitate is filtered off with suction. The filter cake is washed with dilute hydrochloric acid and then with isopropanol and dried in vacuo at 60° C. The substances contained in the product correspond to the following formulae:

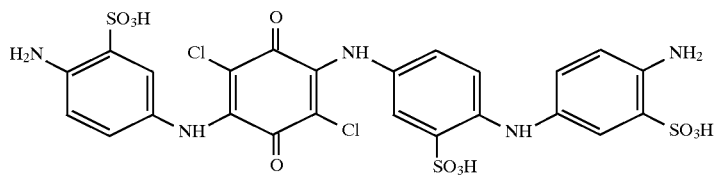

A

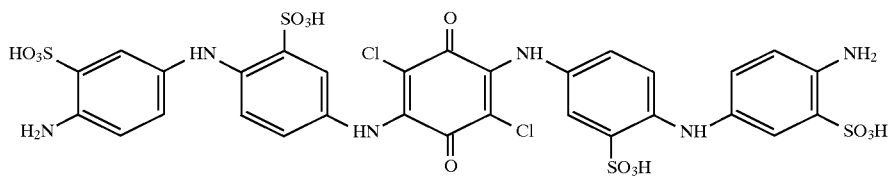

B

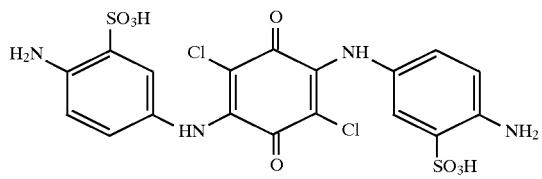

C

The unsymmetric product A makes up the main content in the mixture.

b) Cyclization to the triphendioxazine 40 g of the above anil are introduced into 110 ml of 20% strength oleum. 0.1 g of potassium iodide is now added, 50 ml of 65% strength oleum is allowed 5 to run, while cooling, and stirring is then continued at 25° C. until a chromatographic sample indicates complete cyclization. The mixture is poured onto 1.4 kg of ice and 450 ml of water and the product is salted out with potassium chloride. The precipitate is filtered off with suction, covered with 25% strength potassium chloride solution and dried in vacuo in 50° C. The product corresponds in its main content to the formula

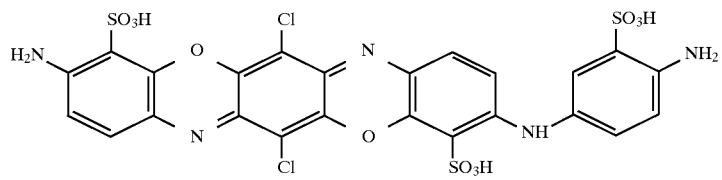

c) Condensation to the reactive dyestuff 25.0 g of triphendioxazine color base from Section b), calculated with respect to the salt-free and anhydrous product, are dissolved in water at pH 6. 4.1 ml of cyanuric fluoride are added dropwise at 0° C. and the pH is kept at 4.5 with sodium carbonate solution. A solution, rendered neutral, of 7.6 g of 3-(2'-sulfatoethylsulfonyl)-1-propylamine is then added and the pH is kept at 7.0. When the reaction has ended, the dyestuff is salted out, filtered off with suction and, after making into a paste with phosphate buffer of pH 6, dried in vacuo at 50° C.

The product of the main formula

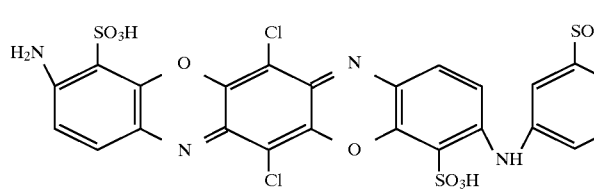
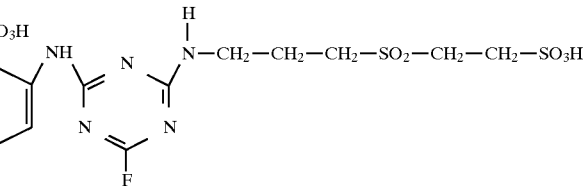

dyes cotton in greenish-tinged blue shades.

$\lambda_{max}$=598 nm (H$_2$O)

EXAMPLE 55 a) Preparation of the anil component 50.8 g of 4-(β-aminoethylamino)-3-sulfoaniline and 44.7 g of 4-aminoanisolesulfonic acid are dissolved in 1250 ml of water and 250 ml of isopropanol at pH 6.0 under nitrogen. The solution is heated to 50° C., 54.1 g of chloranil are introduced and the pH is kept at 6.0. When the reaction has ended, the mixture is allowed to cool to room temperature. The product which has precipitated out is filtered off with suction, washed with water and then covered with 350 ml of acetone and dried. The resulting anil comprises a mixture of the three substances A–C in which components A and B predominate.

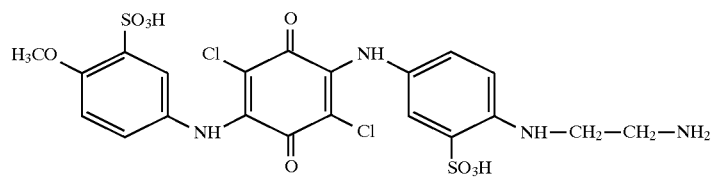

A

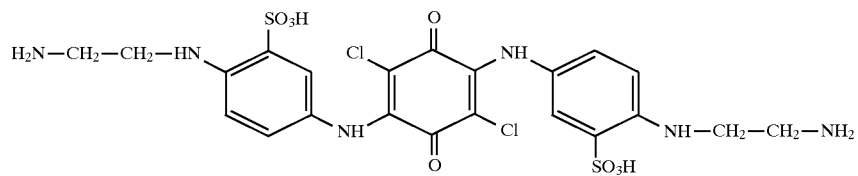

B

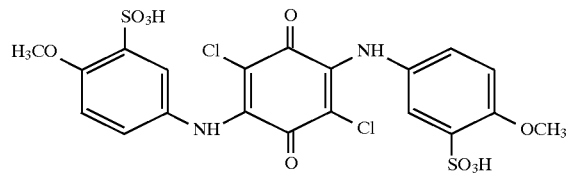

C b) Cyclization to the triphendioxazine 114 g of the above anil mixture are introduced into 285 ml of 20% strength oleum at −10° to +4° C. in the course of 3 hours. The mixture is subsequently stirred at 25° C. until complete solution has occurred. 113 g of potassium peroxodisulfate are sprinkled in at 30° C.

The resulting blue solution is stirred into ice/water and the resulting suspension is salted out. The precipitate is filtered off with suction and washed free from sulfate ions with 15% strength potassium chloride solution. After drying in vacuo at 60° C., 154 g of a salt-containing or, after subtraction of the analytically determined potassium chloride, 106.4 g of salt-free, triphendioxazine mixture are obtained.

c) Conversion to the reactive dyestuff 50 g of triphendioxazine mixture (calculated with respect to salt-free substance) are suspended in 1000 ml of water and dissolved with sodium hydroxide solution at pH 11–12.

From 51.0 g of the compound of the formula

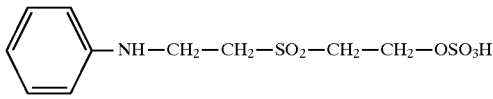

in 100 ml of water and 100 g of ice, the reactive component of the formula

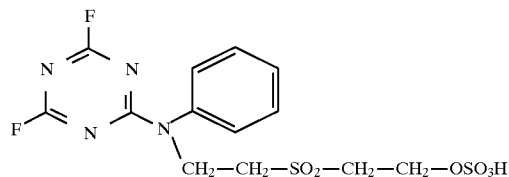

is prepared by dropwise addition of 15.9 ml of cyanuric fluoride at 0°–3° C. and pH 4.0–4.5 as described in Example 4.

5% of the reactive component is initially introduced into ice-water. The solution of the triphendioxazine component and the reactive component are introduced synchronously. During this operation and thereafter, the pH in the reaction mixture is kept at 8.6–8.8 and the temperature is kept at 0°–3° C. When the reaction has ended, the temperature is increased to 20° C. for 2 hours and the dyestuff is salted out of the blue solution, washed with salt solution and, after buffering with phosphate, dried at 45° C. in vacuo.

The dyestuff comprises a mixture of the contents originating from the unsymmetric anil A and the symmetric anil B, in which the dyestuff of the formula

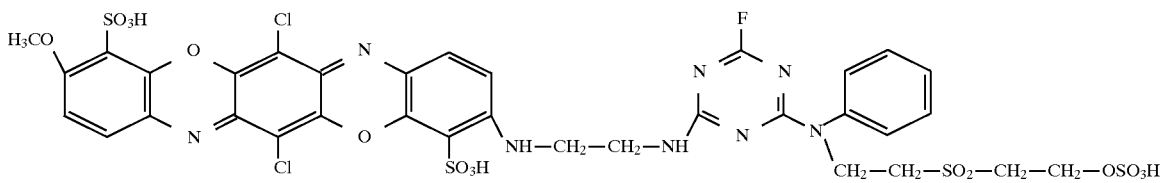

$\lambda_{max}$=598 nm (H$_2$O)

predominates.

The dyestuff dyes cellulose fibers in reddish-tinged blue shades with excellent fastness properties and a good fixing yield.

EXAMPLE 56

50.0 g of triphendioxazine mixture of Example 55b)

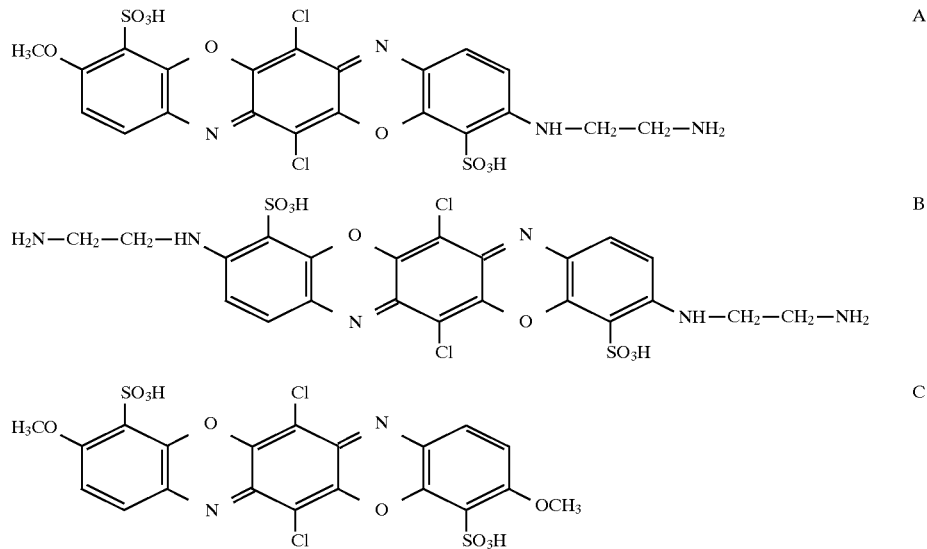

are dissolved in 1000 ml of water at pH 11.5. This solution is allowed to react in the manner described in Example 55c) with the solution of a reactive component which has been prepared in accordance with the procedure of Example 1c) from 64.2 g

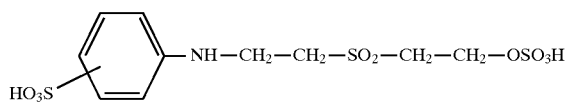

and 15.9 ml of cyanuric fluoride in the presence of 5.1 g of sodium fluoride.

Working up of the resulting reddish-tinged blue solution by salting out, filtration with suction and drying in the presence of buffers gives, in addition to the symmetric reactive dyestuff content originating from the triphendioxazine base content B, a product of the formula

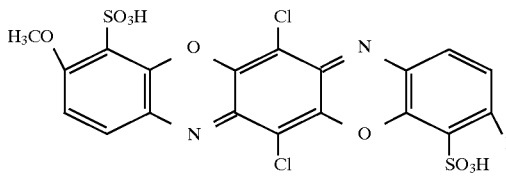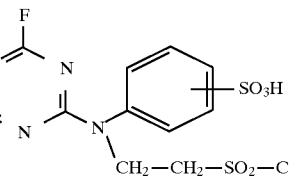

The dyestuff mixture dyes cotton in reddish-tinged blue shades with excellent fastness properties and a good fixing yield.

We claim:

1. A reactive dyestuff of the formula

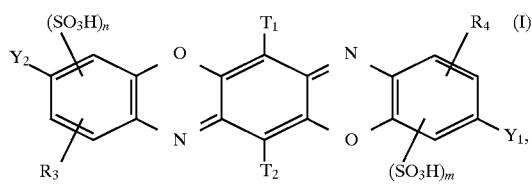

in which $Y_1$ is a radical of the formula

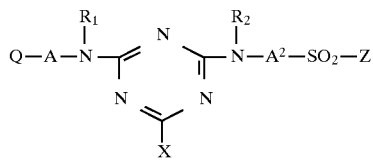

in which

A is unsubstituted $C_2$–$C_6$-alkylene or $C_2$–$C_6$-alkylene which is substituted by a substituent selected from the group consisting of OH and $OSO_3H$ or represents $C_2$–$C_6$-alkylene which is interrupted by at least one heteroatom selected from the group consisting of N, O, S, Se and Te or represents unsubstituted phenylene or phenylene which is substituted by a substituent selected from the group consisting of $SO_3H$, COOH, $C_1$–$C_2$-alkyl and $C_1$–$C_2$-alkoxy, $A^2$ is $CH_2CH_2$, $R_1$ is H, unsubstituted $C_1$–$C_4$-alkyl or $C_1$–$C_4$-alkyl which is substituted by a substituent selected from the group consisting of OH, $OSO_3H$, COOH, $COOC_1$–$C_4$-alkyl, $CONH_2$, and $SO_3H$, $R_2$ is phenyl which is unsubstituted or substituted by a substituent selected from the group consisting of $SO_3H$, COOH, $C_1$–$C_2$-alkyl and $C_1$–$C_2$-alkoxy, Q is

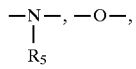

in which $R_5$ is H or $C_1$–$C_4$-alkyl or $R_5$ and $R_1$ together form a —$CH_2$—$CH_2$— bridge and the grouping

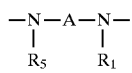

forms a piperazinediyl radical,

X is F, or Cl,

Z is —$CH=CH_2$, or —$CH_2$—$CH_2$—$OSO_3H$, $Y_2$ is amino; $C_1$–$C_4$-alkylamino which is unsubstituted or substituted by a substituent selected from the group consisting of OH, $OSO_3H$, $SO_3H$, COOH, $CONH_2$, and $C_1$–$C_2$-alkoxy or is $C_1$–$C_4$-alkoxy which is unsubstituted or substituted by a substituent selected from the group consisting of OH, $OSO_3H$ and $C_1$–$C_2$-alkoxy or is $C_1$–$C_4$-alkoxy which is interrupted by at least one heteroatom selected from the group consisting of N, O, S, Se and Te or is aryloxy which is unsubstituted or is substituted by a substituent selected from the group consisting of $SO_3H$, $C_1$–$C_2$-alkyl and $C_1$–$C_2$-alkoxy, m is 1 or 2, n is 1 or 2, $T_1$ and $T_2$ each independently is H, Cl, Br, $C_1$–$C_4$-alkoxy, $C_1$–$C_4$-alkyl, unsubstituted phenoxy or unsubstituted phenyl, and $R_3$ and $R_4$ each independently is H, $C_1$–$C_2$-alkyl $C_1$–$C_2$-alkoxy, carboxyl, Cl or Br.

2. The reactive dyestuff according to claim 1, wherein A is an unsusbsituted $C_2$–$C_6$-alkylene or $C_2$–$C_6$-alkylene which is substituted by a substituent selected from the group consisting of OH and $OSO_3H$ or represents $C_2$–$C_6$-alkylene which is interrupted by at least one heteroatom selected from the group consisting of N, O, and S or represents unsubstituted phenylene or phenylene which is substituted by a substituent selected from the group consisting of SO3H, COOH, $C_1$–$C_2$-alkyl and $C_1$–$C_2$-alkoxy, $Y_2$ is amino; $C_1$–$C_4$-alkylamino which is unsubstituted or substituted by a substituent selected from the group consisting of OH, $OSO_3H$, $SO_3H$, COOH, $CONH_2$, and $C_1$–$C_2$-alkoxy or is $C_1$–$C_4$-alkoxy which is unsubstituted or substituted by a substituent selected from the group consisting of OH, $OSO_3H$ and $C_1$–$C_2$-alkoxy or is $C_1$–$C_4$-alkoxy which is interrupted by at least one heteroatom selected from the group consisting of N, O and S or is aryloxy which is unsubstituted or is substituted by a substituent selected from the group consisting of $SO_3H$, $C_1$–$C_2$-alkyl and $C_1$–$C_2$-alkoxy.

3. The reactive dyestuff according to claim 1, wherein A is is an unsusbsituted $C_2$–$C_6$-alkylene or $C_2$–$C_6$-alkylene which is substituted by a substituent selected from the group consisting of OH and $OSO_3H$ or represents $C_2$–$C_6$-alkylene which is interrupted by by at least one heteroatom selected from the group consisting of N and 0 or represents unsubstituted phenylene or phenylene which is substituted by a substituent selected from the group consisting of $SO_3H$, COOH, $C_1$–$C_2$-alkyl and $C_1$–$C_2$-alkoxy, $Y_2$ is amino; $C_1$–$C_4$-alkylamino which is unsubstituted or substituted by a substituent selected from the group consisting of OH, $OSO_3H$, $SO_3H$, COOH, $CONH_2$, and $C_1$–$C_2$-alkoxy or is $C_1$–$C_4$-alkoxy which is unsubstituted or substituted by a substituent selected from the group consisting of OH, $OSO_3H$ and $C_1$–$C_2$-alkoxy or is $C_1$–$C_4$-alkoxy which is interrupted by at least one heteroatom selected from the group consisting of N and O or is aryloxy which is unsubstituted or is substituted by a substituent selected from the group consisting of $SO_3H$, $C_1$–$C_2$-alkyl and $C_1$–$C_2$-alkoxy.

4. The reactive dyestuff according to claim 1, wherein A is is an unsusbsituted $C_2$–$C_6$-alkylene or $C_2$–$C_6$-alkylene which is substituted by a substituent selected from the group consisting of OH and $OSO_3H$ or represents $C_2$–$C_6$-alkylene which is interrupted by at least one N heteroatom or represents unsubstituted phenylene or phenylene which is substituted by a substituent selected from the group consisting of $SO_3H$, COOH, $C_1$–$C_2$-alkyl and $C_1$–$C_2$-alkoxy, $Y_2$ is amino; $C_1$–$C_4$-alkylamino which is unsubstituted or substituted by a substituent selected from the group consisting of OH, $OSO_3H$, $SO_3H$, COOH, $CONH_2$, and $C_1$–$C_2$-alkoxy or is $C_1$–$C_4$-alkoxy which is unsubstituted or substituted by a substituent selected from the group consisting of OH, $OSO_3H$ and $C_1$–$C_2$-alkoxy or is $C_1$-$C_4$-alkoxy which is interrupted by at least one N heteroatom or is aryloxy which is unsubstituted or is substituted by a substituent selected from the group consisting of $SO_3H$, $C_1$–$C_2$-alkyl and $C_1$–$C_2$-alkoxy.

5. A reactive dyestuff according to claim 1, in which A is ethylene, 1,3-propylene, 1,2-propylene, 2-hydroxy-1,3-propylene 2-sulfato-1,3-propylene, 1,4-, 1,3- and 2,3-butylene, 1,5-pentylene, 1,6- and 2,5-hexylene, 1,4- or 1,3-cyclohexylene, —$(CH_2$—$CH_2$—$O)_n$—$CH_2$—$CH_2$— where n=1 to 3,

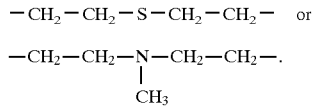

6. A reactive dyestuff according to claim 1, in which A is 1,2-, 1,3- and 1,4-phenylene, 4-sulfo-1,3-phenylene, 6-sulfo-1,3-phenylene, 2- or 3-sulfo-1,4-phenylene, 4,6-disulfo-1,3-phenylene, 2- or 3-methyl-1,4-phenylene, 4- or 6-methyl-1,3-phenylene, 5-methyl-1,2-phenylene, 3-chloro-1,4-phenylene, 4-chloro-1,3-phenylene or 4-chloro-1,2-phenylene or corresponding methyl- and chlorophenylene radicals substituted by sulfo groups.

7. A reactive dyestuff according to claim 1, in which $R_1$ is hydrogen or methyl, ethyl, 1-propyl, 2-hydroxyethyl, 2-sulfatoethyl, 2-sulfoethyl, 2-arboxyethyl, 2-aminocarbonylethyl, 2-methoxy- or 2-ethoxycarbonylethyl or 2-carboxy-1-propyl, $R_2$ is phenyl, 2-, 3-, 4-sulfophenyl, 2-, 3-, 4-methylphenyl, 2-, 3-, 4-methoxy- or -ethoxyphenyl and the corresponding methyl-, methoxy- or ethoxyphenyl radicals substituted by sulfo groups, and 2-, 3- and 4-carboxyphenyl, $R_5$ is hydrogen or methyl, ethyl, 2-hydroxyethyl or 2-sulfatoethyl, and in which the radicals $R_1$ and $R_5$ can also be, linked directly to one another, and the grouping

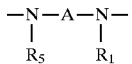

forms a piperazinediyl radical.

8. A reactive dyestuff according to claim 1, in which $Y_2$ is $NH_2$ or methylamino, ethylamino, 1- or 2-propylamino, 1- or 2-butylamino, cyclohexylamino, 2-hydroxyethylamino, 2-sulfatoethylamnino, 2-sulfoethylamino, 2-carboxyethylamino, 2-aminocarbonylethylamino, 2-methyl-1-propylamino, 2-hydroxy-1-propylamino, 2-sulfato- 1-propylamino, 2-carboxy- 1-propylamino, 2-methoxyethylamino, 2-ethoxyethylamino, 2-(2'-hydroxyethoxy)-ethylamino or 2-(2'-sulfatoethoxy)-ethylamino.

9. A reactive dyestuff according to claim 1, in which is phenoxy, 2-, 3- or 4-sulfophenoxy, 2-, 3- or 4-cresoxy, 2-, 3- or 4-methoxyphenoxy, 1- or 2-naphthoxy or a cresoxy, methoxyphenoxy or naphthoxy radical substituted by sulfo groups or a $C_1$–$C_4$-alkoxy radical which is optionally substituted.

\* \* \* \* \*